United States Patent
Krishnan et al.

(10) Patent No.: US 12,207,150 B2
(45) Date of Patent: Jan. 21, 2025

(54) ENHANCEMENTS TO MOBILITY SETTINGS CHANGE PROCEDURES

(71) Applicant: QUALCOMM Incorporated, San Diego, CA (US)

(72) Inventors: Shankar Krishnan, San Diego, CA (US); Xipeng Zhu, San Diego, CA (US); Rajeev Kumar, San Diego, CA (US); Gavin Bernard Horn, La Jolla, CA (US)

(*) Notice: Subject to any disclaimer, the term of this patent is extended or adjusted under 35 U.S.C. 154(b) by 147 days.

(21) Appl. No.: 17/394,251

(22) Filed: Aug. 4, 2021

(65) Prior Publication Data

US 2022/0046507 A1 Feb. 10, 2022

Related U.S. Application Data

(60) Provisional application No. 63/061,747, filed on Aug. 5, 2020.

(51) Int. Cl.
| | |
|---|---|
| *H04W 36/22* | (2009.01) |
| *H04W 28/08* | (2023.01) |
| *H04W 28/086* | (2023.01) |
| *H04W 36/00* | (2009.01) |
| *H04W 36/08* | (2009.01) |
| H04W 36/32 | (2009.01) |

(52) U.S. Cl.
CPC .......... *H04W 36/22* (2013.01); *H04W 28/08* (2013.01); *H04W 28/0862* (2023.05); *H04W 36/0016* (2013.01); *H04W 36/00837* (2018.08); *H04W 36/085* (2023.05); *H04W 36/13* (2023.05); *H04W 36/324* (2023.05)

(58) Field of Classification Search
None
See application file for complete search history.

(56) References Cited

U.S. PATENT DOCUMENTS

| | | | | |
|---|---|---|---|---|
| 10,516,999 B1* | 12/2019 | Desai | ..................... | H04W 16/28 |
| 2011/0263262 A1* | 10/2011 | Min | ..................... | H04W 36/30 |
| | | | | 455/438 |
| 2014/0050089 A1* | 2/2014 | Zhang | .................. | H04B 7/0617 |
| | | | | 370/232 |
| 2015/0023209 A1* | 1/2015 | Gunnarsson | .......... | H04W 84/18 |
| | | | | 370/254 |
| 2018/0359661 A1* | 12/2018 | Bedekar | ................ | H04W 24/02 |
| 2019/0132778 A1* | 5/2019 | Park | ..................... | H04W 24/10 |
| 2019/0208438 A1* | 7/2019 | Yang | ....................... | H04L 43/08 |

(Continued)

*Primary Examiner* — Kodzovi Acolatse

(57) ABSTRACT

Methods, systems, and devices for wireless communications are described, in which a base station may determine a load balancing adjustment for traffic communicated through the base station. The load balancing adjustment may be provided at a beam level for one or more beams of a plurality of beams, at a network slice level for one or more network slice IDs of a number of network slice IDs, or combinations thereof. The base station may use the load balancing adjustment to identify one or more updated parameters for triggering a handover of at least one user equipment (UE) between beams or slice IDs of a same cell or different cells. The base station may format a mobility change request that indicates the one or more parameters that are updated, and transmit the mobility change request to another base station to establish parameters for handovers between the base stations.

28 Claims, 15 Drawing Sheets

(56) References Cited

U.S. PATENT DOCUMENTS

| | | | |
|---|---|---|---|
| 2020/0128459 A1* | 4/2020 | Engström | H04W 36/10 |
| 2021/0058829 A1* | 2/2021 | Ozturk | H04L 41/0803 |
| 2021/0068016 A1* | 3/2021 | Shi | H04W 36/08 |
| 2021/0377828 A1* | 12/2021 | Tao | H04W 74/0833 |
| 2022/0015001 A1* | 1/2022 | Parichehrehteroujeni | H04W 36/00 |
| 2022/0070741 A1* | 3/2022 | Eklöf | H04W 36/0077 |
| 2022/0201561 A1* | 6/2022 | Bin Redhwan | H04W 36/0058 |
| 2022/0240326 A1* | 7/2022 | Rune | H04W 74/0866 |
| 2022/0272589 A1* | 8/2022 | Ishii | H04W 36/0058 |
| 2022/0279382 A1* | 9/2022 | Balan | H04W 16/28 |
| 2022/0322175 A1* | 10/2022 | Liu | H04W 36/22 |
| 2022/0408323 A1* | 12/2022 | Ishii | H04W 36/0055 |
| 2023/0180083 A1* | 6/2023 | Shi | H04W 36/08 370/331 |

* cited by examiner

ENHANCEMENTS TO MOBILITY SETTINGS CHANGE PROCEDURES

CROSS REFERENCE

The present Application for Patent claims the benefit of U.S. Provisional Patent Application No. 63/061,747 by KRISHNAN et al., entitled "ENHANCEMENTS TO MOBILITY SETTINGS CHANGE PROCEDURES," filed Aug. 5, 2020, assigned to the assignee hereof, and expressly incorporated by reference herein.

FIELD OF TECHNOLOGY

The following relates to wireless communications, including enhancements to mobility settings change procedures.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications system may implement mobility load balancing (MLB) to ensure a uniformly-distributed traffic load among cells or areas of cells. For example, using MLB, a traffic load may be offloaded from a congested cell of a base station to relatively less congested cells of other base stations. Such load balancing may allow for more efficient operations of cells, and thus enhancements to load balancing may be desirable in order to further enhance system efficiencies.

SUMMARY

The described techniques relate to improved methods, systems, devices, and apparatuses that support enhancements to mobility settings change procedures. In various aspects, the described techniques provide that a base station (e.g., a first base station) may determine a load balancing adjustment for one or more beams of a plurality of beams, one or more network slice identifications (IDs) of a number of network slice IDs, or combinations thereof. In some cases, the base station may use the load balancing adjustment to identify one or more updated parameters for triggering a handover of at least one user equipment (UE) between beams or slice IDs of different cells. The base station may, in some cases, format a mobility change request that indicates the one or more parameters that are updated to provide the load balancing adjustment for the one or more beams, one or more network slice IDs, or combinations thereof. The base station may transmit the mobility change request to one or more other base stations, and the updated parameters may be used for initiating handover of one or more UEs. In some cases, the mobility change request may include a synchronization signal block (SSB) ID list that indicates one or more beams of the first base station or the second base station. Additionally or alternatively, the mobility change request may include a slice ID that indicates a type of application associated with updated mobility parameters (e.g., different slice IDs may be associated with enhanced mobile broadband (eMBB) and ultra-reliable low latency communications (URLLC)).

In some cases, the mobility change request may indicate the updated parameters as a difference between an existing parameter value and the updated parameter value. In some cases, the mobility change request may, additionally or alternatively, include one or more parameters associated with conditional handover of a UE between base stations. Such conditional handover parameters may include parameters associated with preparing one or more cells for a conditional handover, one or more parameters associated with executing a conditional handover, or any combinations thereof. Further, in some cases, the mobility change request may include reselection parameters for determining a base station that is to be selected by a UE when the UE transitions from an idle mode to a connected mode. Further, in some cases, a base station that receives a mobility change request may determine that one or more of the updated parameters are unsuitable, and may transmit a mobility change failure message to the originating base station, that indicates one or more lower or upper limits for one or more updated parameters.

A method of wireless communication at a first base station is described. The method may include determining a load balancing adjustment to be applied to one or more beams of a set of beams, one or more network slice identifications of a set of network slice identifications, or combinations thereof, for determining a handover of at least one UE from the first base station to a second base station, formatting, based on the determining, a mobility change request that indicates one or more parameters that are updated to provide the load balancing adjustment for the one or more beams, one or more network slice identifications, or combinations thereof, and transmitting the mobility change request to the second base station.

An apparatus for wireless communication at a first base station is described. The apparatus may include a processor, memory coupled with the processor, and instructions stored in the memory. The instructions may be executable by the processor to cause the apparatus to determine a load balancing adjustment to be applied to one or more beams of a set of beams, one or more network slice identifications of a set of network slice identifications, or combinations thereof, for determining a handover of at least one UE from the first base station to a second base station, format, based on the determining, a mobility change request that indicates one or more parameters that are updated to provide the load balancing adjustment for the one or more beams, one or more network slice identifications, or combinations thereof, and transmit the mobility change request to the second base station.

Another apparatus for wireless communication at a first base station is described. The apparatus may include means for determining a load balancing adjustment to be applied to one or more beams of a set of beams, one or more network slice identifications of a set of network slice identifications, or combinations thereof, for determining a handover of at least one UE from the first base station to a second base station, formatting, based on the determining, a mobility change request that indicates one or more parameters that are updated to provide the load balancing adjustment for the one or more beams, one or more network slice identifications, or combinations thereof, and transmitting the mobility change request to the second base station.

A non-transitory computer-readable medium storing code for wireless communication at a first base station is described. The code may include instructions executable by a processor to determine a load balancing adjustment to be applied to one or more beams of a set of beams, one or more network slice identifications of a set of network slice identifications, or combinations thereof, for determining a handover of at least one UE from the first base station to a second base station, format, based on the determining, a mobility change request that indicates one or more parameters that are updated to provide the load balancing adjustment for the one or more beams, one or more network slice identifications, or combinations thereof, and transmit the mobility change request to the second base station.

In some examples of the method, apparatuses, and non-transitory computer-readable medium described herein, the mobility change request indicates a difference from a previous value of the one or more parameters based on the load balancing adjustment. In some examples of the method, apparatuses, and non-transitory computer-readable medium described herein, the formatting the mobility change request further may include operations, features, means, or instructions for formatting an information element with a first beam identification list that indicates one or more beams associated with the first base station and a second beam identification list that indicates one or more beams associated with the second base station. In some examples of the method, apparatuses, and non-transitory computer-readable medium described herein, the first beam identification list and the second beam identification list each include one or more synchronization signal blocks (SSBs) associated with the mobility change request.

In some examples of the method, apparatuses, and non-transitory computer-readable medium described herein, the formatting the mobility change request further may include operations, features, means, or instructions for formatting an information element with a first slice identification associated with the first base station and a second slice identification associated with the second base station. In some examples of the method, apparatuses, and non-transitory computer-readable medium described herein, the first slice identification and the second slice identification may be associated with ultra-reliable low latency communication (URLLC) transmissions, enhanced mobile broadband (eMBB) transmissions, or massive machine type communications (mMTC) transmissions.

In some examples of the method, apparatuses, and non-transitory computer-readable medium described herein, the formatting the mobility change request further may include operations, features, means, or instructions for identifying one or more updated parameters for a conditional handover, where the one or more updated parameters are associated with conditions for executing operations associated with the handover of the at least one UE from the first base station to the second base station. In some examples of the method, apparatuses, and non-transitory computer-readable medium described herein, the one or more updated parameters for the conditional handover indicate one or more conditional handover preparation parameter thresholds that indicate when a target cell is to be prepared for a handover, one or more conditional handover execution parameter thresholds that indicate that the target cell is to be selected for the handover, or any combinations thereof. In some examples of the method, apparatuses, and non-transitory computer-readable medium described herein, the one or more updated parameters for conditional handover may be different than non-conditional handover parameters and may be adjusted independently of the non-conditional handover parameters.

In some examples of the method, apparatuses, and non-transitory computer-readable medium described herein, the formatting the mobility change request further may include operations, features, means, or instructions for configuring one or more reselection parameters that indicate how the at least one UE is to reselect to a new cell when in an idle or inactive state. In some examples of the method, apparatuses, and non-transitory computer-readable medium described herein, the one or more reselection parameters are to be provided to the at least one UE in a SIB communication from the first base station or the second base station.

Some examples of the method, apparatuses, and non-transitory computer-readable medium described herein may further include operations, features, means, or instructions for receiving, from the second base station, a mobility change failure response that indicates one or more of a change limit for one or more parameters, one or more associated beams, one or more associated slice IDs, or combinations thereof, that are associated with the second base station. In some examples of the method, apparatuses, and non-transitory computer-readable medium described herein, the change limit for one or more parameters indicates an upper limit for a conditional handover to the second base station, a lower limit for a conditional handover to the second base station, or any combinations thereof. In some examples of the method, apparatuses, and non-transitory computer-readable medium described herein, the mobility change failure response includes at least one information element that indicates one or more available beam identifications, slice identification, or combinations thereof, associated with the second base station.

A method of wireless communication at a first base station is described. The method may include identifying, for at least a first UE with an established connection with the first base station, a conditional handover parameter for a conditional handover of the first UE from the first base station to a second base station, where the conditional handover is triggered based on a first parameter associated with the first UE, determining, a conditional handover trigger adjustment to be applied the first parameter based on a load balancing procedure at the first base station, and transmitting an indication of the conditional handover trigger adjustment to the second base station.

An apparatus for wireless communication at a first base station is described. The apparatus may include a processor, memory coupled with the processor, and instructions stored in the memory. The instructions may be executable by the processor to cause the apparatus to identify, for at least a first UE with an established connection with the first base station, a conditional handover parameter for a conditional handover of the first UE from the first base station to a second base station, where the conditional handover is triggered based on a first parameter associated with the first UE, determine, a conditional handover trigger adjustment to be applied the first parameter based on a load balancing procedure at the first base station, and transmit an indication of the conditional handover trigger adjustment to the second base station.

Another apparatus for wireless communication at a first base station is described. The apparatus may include means for identifying, for at least a first UE with an established connection with the first base station, a conditional handover parameter for a conditional handover of the first UE from the first base station to a second base station, where the conditional handover is triggered based on a first parameter associated with the first UE, determining, a conditional handover trigger adjustment to be applied the first parameter based on a load balancing procedure at the first base station, and transmitting an indication of the conditional handover trigger adjustment to the second base station.

A non-transitory computer-readable medium storing code for wireless communication at a first base station is described. The code may include instructions executable by a processor to identify, for at least a first UE with an established connection with the first base station, a conditional handover parameter for a conditional handover of the first UE from the first base station to a second base station, where the conditional handover is triggered based on a first parameter associated with the first UE, determine, a conditional handover trigger adjustment to be applied the first parameter based on a load balancing procedure at the first base station, and transmit an indication of the conditional handover trigger adjustment to the second base station.

In some examples of the method, apparatuses, and non-transitory computer-readable medium described herein, the transmitting may include operations, features, means, or instructions for transmitting the indication of the conditional handover trigger adjustment in a mobility change request. In some examples of the method, apparatuses, and non-transitory computer-readable medium described herein, the mobility change request includes values for one or more of a conditional handover preparation trigger threshold, a conditional handover execution trigger threshold, one or more reselection parameters, or any combinations thereof. In some examples of the method, apparatuses, and non-transitory computer-readable medium described herein, the conditional handover preparation trigger threshold and the conditional handover execution trigger threshold may be adjusted separately from one or more threshold values for non-conditional handovers between the first base station and the second base station. In some examples of the method, apparatuses, and non-transitory computer-readable medium described herein, the indication of the conditional handover trigger adjustment may be a difference from a previous value of the conditional handover parameter based on the load balancing procedure.

In some examples of the method, apparatuses, and non-transitory computer-readable medium described herein, the transmitting further may include operations, features, means, or instructions for formatting an information element for a mobility change request with a first beam identification list that indicates one or more beams associated with the first base station and a second beam identification list that indicates one or more beams associated with the second base station. In some examples of the method, apparatuses, and non-transitory computer-readable medium described herein, the first beam identification list and the second beam identification list each include one or more SSBs associated with the mobility change request.

In some examples of the method, apparatuses, and non-transitory computer-readable medium described herein, the transmitting further may include operations, features, means, or instructions for formatting an information element for a mobility change request with a first slice identification associated with the first base station and a second slice identification associated with the second base station. In some examples of the method, apparatuses, and non-transitory computer-readable medium described herein, the first slice identification and the second slice identification may be associated with URLLC transmissions, eMBB transmissions, or mMTC transmissions.

In some examples of the method, apparatuses, and non-transitory computer-readable medium described herein, the transmitting further may include operations, features, means, or instructions for configuring one or more reselection parameters that indicate how at least the first UE is to reselect to a new cell when in an idle or inactive state. In some examples of the method, apparatuses, and non-transitory computer-readable medium described herein, the one or more reselection parameters are to be provided to the at least one UE in a SIB communication from the first base station or the second base station.

Some examples of the method, apparatuses, and non-transitory computer-readable medium described herein may further include operations, features, means, or instructions for receiving, from the second base station, a mobility change failure response that indicates one or more of a change limit for one or more parameters, one or more associated beams, one or more associated slice IDs, or combinations thereof, that are associated with the second base station. In some examples of the method, apparatuses, and non-transitory computer-readable medium described herein, the change limit for one or more parameters indicates an upper limit for a conditional handover to the second base station, a lower limit for a conditional handover to the second base station, or any combinations thereof. In some examples of the method, apparatuses, and non-transitory computer-readable medium described herein, the mobility change failure response includes at least one information element that indicates one or more available beam identifications, slice identification, or combinations thereof, associated with the second base station.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/ purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

DETAILED DESCRIPTION

Figure 1:
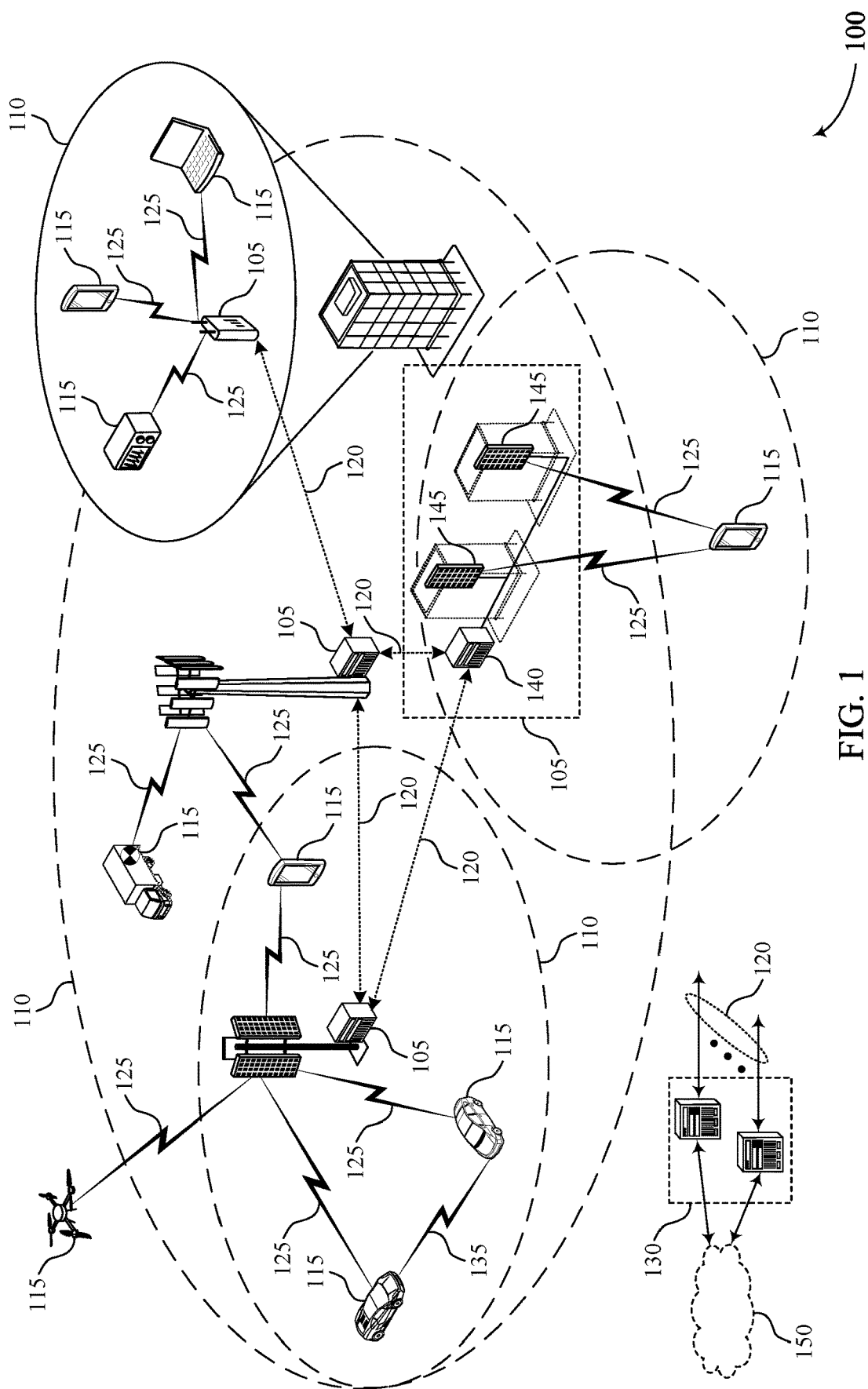
FIG. 1 illustrates an example of a system for wireless communications that supports enhancements to mobility settings change procedures in accordance with aspects of the present disclosure.

Some wireless communications systems may support mobility load balancing (MLB). The objective of MLB may be to distribute a traffic load evenly among cells and among areas of cell by transferring traffic from congested cells to less congested cells. A function of MLB may include load reporting by exchanging information over respective interfaces between nodes (e.g., Xn, X2, F1, or E1 interfaces). MLB may thus enhance network efficiency, reduce latency times, and provide network energy savings, through moving some users from one cell, cell area, carrier, or radio access technology (RAT) to another cell, cell area, carrier, or RAT, or any combinations thereof.

In some cases, load balancing may be achieved through adapting handover parameters for user equipment (UE) handover between cells, cell areas, carriers, or RATs. Such handover parameters may determine thresholds for initiating a handover of a UE from a source cell to a target cell. Further, in some cases, load balancing may be achieved through adapting one or more reselection parameters that adjust cell selection for a UE that is in idle mode and selecting a cell for moving out of idle mode. Such adaptation of handover parameters, reselection parameters, or combinations thereof, may be provided through exchange of information between base stations or cells, such as through a mobility settings change procedure (e.g., through a mobility change request message). For example, a source cell that initializes the load balancing may estimate if it is needed to change mobility configuration in the source and/or target cell.

If it is determined to update parameters of the mobility configuration, the source cell may initialize a mobility negotiation procedure toward the target cell, in which the source cell informs the target cell about the new mobility setting (e.g., through a mobility change request message) and may provide cause for the change (e.g., load balancing related request). The updated parameters, for example, may provide updates to a handover trigger as a cell-specific offset that corresponds to a threshold at which a cell initializes the handover preparation procedure. In accordance with various aspects as discussed herein, updates may be provided at a cell level, at a beam level, at a network slice ID level, or any combinations thereof. Further, aspects may provide updated triggers and/or thresholds associated with conditional handover procedures, may provide updates to cell reselection parameters, or any combinations thereof. In some cases, updated parameters may be provided as actual parameter values or may be provided as a difference (delta) between the current and the new values of one or more parameters.

In various aspects, the described techniques provide that a base station (e.g., a first base station, which may be an example of a source base station or a source cell) may determine a load balancing adjustment for one or more beams of a plurality of beams, one or more network slice IDs of a number of network slice IDs, or combinations thereof. In some cases, the base station may use the load balancing adjustment to identify one or more updated parameters for triggering a handover of at least one UE between beams or slice IDs of different cells. The first base station may, in some cases, format a mobility change request that indicates the one or more parameters that are updated to provide the load balancing adjustment for the one or more beams, one or more network slice IDs, or combinations thereof. The first base station may transmit the mobility change request to one or more other base stations (e.g., a second base station, which may be an example of a target base station or a target cell), and the updated parameters may be used for initiating handover of one or more UEs. In some cases, the mobility change request may include a synchronization signal block (SSB) ID list that indicates one or more beams of the first base station or the second base station. Additionally or alternatively, the mobility change request may include a slice ID that indicates a type of application associated with updated mobility parameters (e.g., different slice IDs may be associated with enhanced mobile broadband (eMBB) and ultra-reliable low latency communications (URLLC)).

In some cases, the mobility change request may, additionally or alternatively, include one or more parameters associated with conditional handover of a UE between base stations. Such conditional handover parameters may include parameters associated with preparing one or more cells for a conditional handover, one or more parameters associated with executing a conditional handover, or any combinations thereof. Further, in some cases, the mobility change request may include reselection parameters for determining a base station that is to be selected by a UE when the UE transitions from an idle mode to a connected mode. Further, in some cases, a base station that receives a mobility change request may determine that one or more of the updated parameters are unsuitable, and may transmit a mobility change failure message to the originating base station, that indicates one or more lower or upper limits for one or more updated parameters.

Particular aspects of the subject matter described herein may be implemented to realize one or more advantages. The described techniques may support improvements in the load management of a network to provide for more uniform traffic distribution across the network, which may improve reliability, reduce latency, and enhance network energy savings, among other advantages. As such, supported techniques may include improved network operations and, in some examples, may promote network efficiencies, among other benefits.

Aspects of the disclosure are initially described in the context of wireless communications systems. Aspects of the disclosure are further illustrated by and described with reference to process flows, apparatus diagrams, system diagrams, and flowcharts that relate to enhancements to mobility settings change procedures.

FIG. 1 illustrates an example of a wireless communications system 100 that supports enhancements to mobility settings change procedures in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/$ ($\Delta f_{max} \cdot N_f$) seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

Wireless communications system 100 may utilize MLB to provide a relatively uniform distribution of traffic load among base stations 105 (e.g., cells, or areas of cells). For example, a base station 105 operating in accordance with a first RAT (e.g., E-UTRA or NR) may experience increased traffic loads, which may overload the resources at the base station 105. Using MLB, the traffic load may be offloaded from the congested cell of the base station 105 to less congested cells of nearby base stations 105 also operating in accordance with a first RAT. In some examples, wireless communications system 100 may support mixed deployment of base stations 105 (e.g., E-UTRA and NR base stations 105). Based on traffic congestions, one or more base stations 105 may adjust one or more mobility parameters as part of MLB.

In some cases, a base station 105 may determine a load balancing adjustment for one or more beams of a plurality of beams, one or more network slice IDs of a number of network slice IDs, or combinations thereof. In some cases, the base station may use the load balancing adjustment to identify one or more updated parameters for triggering a handover of at least one UE 115 between beams or slice IDs of a same cell or different cells. The base station 105 may, in some cases, format a mobility change request that indicates the one or more parameters that are updated to provide the load balancing adjustment at a cell level, for one or more beams, one or more network slice IDs, or combinations thereof.

Figure 2:
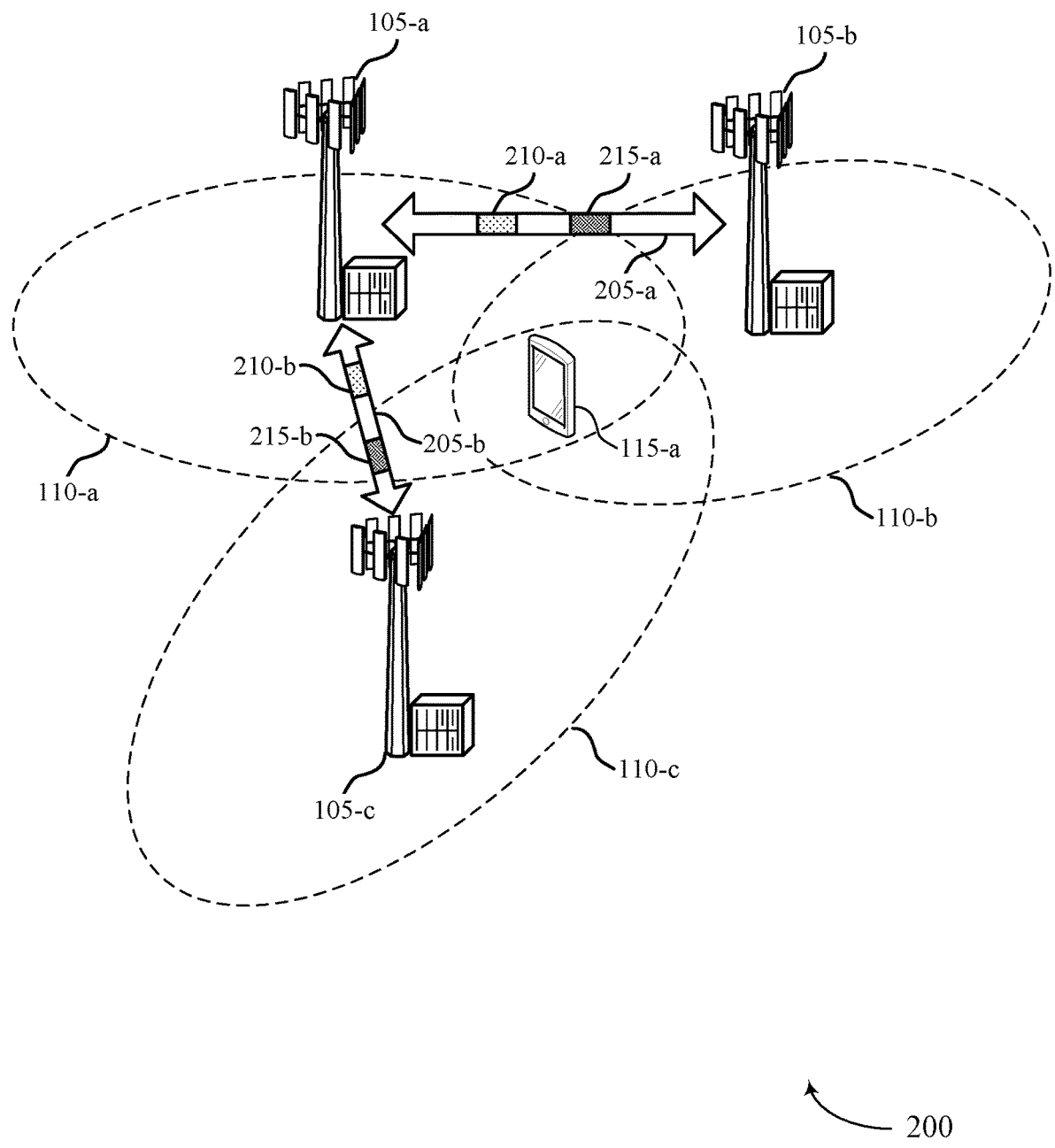
FIG. 2 illustrates an example of a portion of a wireless communications system that supports enhancements to mobility settings change procedures in accordance with aspects of the present disclosure.

FIG. 2 illustrates an example of a wireless communications system 200 that supports enhancements to mobility settings change procedures in accordance with aspects of the present disclosure. In some examples, wireless communications system 200 may implement aspects of wireless communications system 100. Wireless communications system also includes a first base station 105-a, a second base station 105-b, a third base station 105-c, and a UE 115-a, which may be examples of a base station 105 or UE 115, as described with reference to FIG. 1.

In various aspects, base stations 105 may utilize MLB to manage traffic loads. In some cases, base stations 105 may exchange information via backhaul links 205 (e.g., via a first backhaul link 205-a between the first base station 105-a and the second base station 105-b, and a second backhaul link 205-b between the first base station 105-a and the third base station 105-c). Backhaul links 205 may be examples of an X2 interface (e.g., an interface allowing nodes to interconnect with each other) or an Xn interface (e.g., an interface allowing NG-RAN nodes to interconnect with each other). Base stations 105 may also communicate with one or more core networks (e.g., core network 130 of FIG. 1) using backhaul links that may be examples of S1 interfaces (e.g., an interface between a node and a core network). Interfaces may also exist within base stations 105. For example, an F1 interface may allow a central unit (CU) (e.g., a logical node the performs functions of a base station, such as user data transfer, mobility control, session management, radio access network sharing, and the like) and a distributed unit (DU) (e.g., a logical node controlled by the CU and performs a subset of base station functions, for example, based on a functional split between the CU and the DU) of base stations 105 to exchange information. Additionally, E1 interfaces may exist between the control unit user plane (CU-UP) and control unit control plane (CU-CP) of base station 105. In some cases, mobility parameters may be provided to such different functions or units of a base station 105, which may be used for load balancing.

In some cases, the first base station 105-a may transmit a mobility change request 210-a to the second base station 105-b and may transmit a mobility change request 210-b to the third base station 105-c, which may provide updated parameters for initiating handover of UE 115-a (and/or one or more other UEs). The first base station 105-a may be an example of a source base station or source cell, and the second base station 105-b and the third base station 105-c may be examples of a target base station or target cell. In some cases, the mobility change requests 210 may include a synchronization signal block (SSB) ID list that indicates one or more beams of the first base station 105-a and the second base station 105-b or third base station 105-c. Additionally or alternatively, the mobility change requests 210 may include a slice ID that indicates a type of application associated with updated mobility parameters (e.g., different slice IDs may be associated with enhanced mobile broadband (eMBB) and ultra-reliable low latency communications (URLLC)).

In some cases, the mobility change requests 210 may, additionally or alternatively, include one or more parameters associated with conditional handover of the UE 115-a between base stations 105. Such conditional handover parameters may include parameters associated with preparing one or more cells for a conditional handover, one or more parameters associated with executing a conditional handover, or any combinations thereof. Further, in some cases, the mobility change requests 210 may include reselection parameters for determining a base station 105 that is to be selected by the UE 115-a when transitioning out of an idle mode. In some cases, the second base station 105-b may transmit a response message 215-a to the first base station 105-a, and similarly the third base station 105-c may transmit a response message 215-b to the first base station 105-a. In some cases, one or more of the response messages 215 may provide a mobility change acknowledgment, and the base stations 105 may begin operating in accordance with the updated parameters. In other cases, a base station 105 that receives a mobility change request may determine that one or more of the updated parameters are unsuitable, and one or more of the response messages 215 may include a mobility change failure indication. In some cases, the mobility change failure indication may provide one or more lower or upper limits for one or more updated parameters, and the first base station 105-a may then determine one or more updated parameters based on the indicated limits and transmit a subsequent mobility change request 210 based on the indicated limits.

In some cases, the mobility change requests 210 may include a SSB ID list that indicates one or more beams of the first base station 105-a, the second base station 105-b, or the third base station 105-c. Additionally or alternatively, the mobility change request may include a slice ID that indicates a type of application associated with updated mobility parameters. In some cases, the mobility change requests 210 may indicate the updated parameters as a difference between an existing parameter value and the updated parameter value. In some cases, one or more of the mobility change requests 210 may, additionally or alternatively, include one or more parameters associated with conditional handover of the UE 115-a between base stations 105. Such conditional handover parameters may include parameters associated with preparing one or more cells for a conditional handover, one or more parameters associated with executing a conditional handover, or any combinations thereof. Further, in some cases, the mobility change requests 210 may include reselection parameters for determining a base station 105 that is to be selected by the UE 115-a transitioning from an idle mode to a connected mode.

Figure 3:
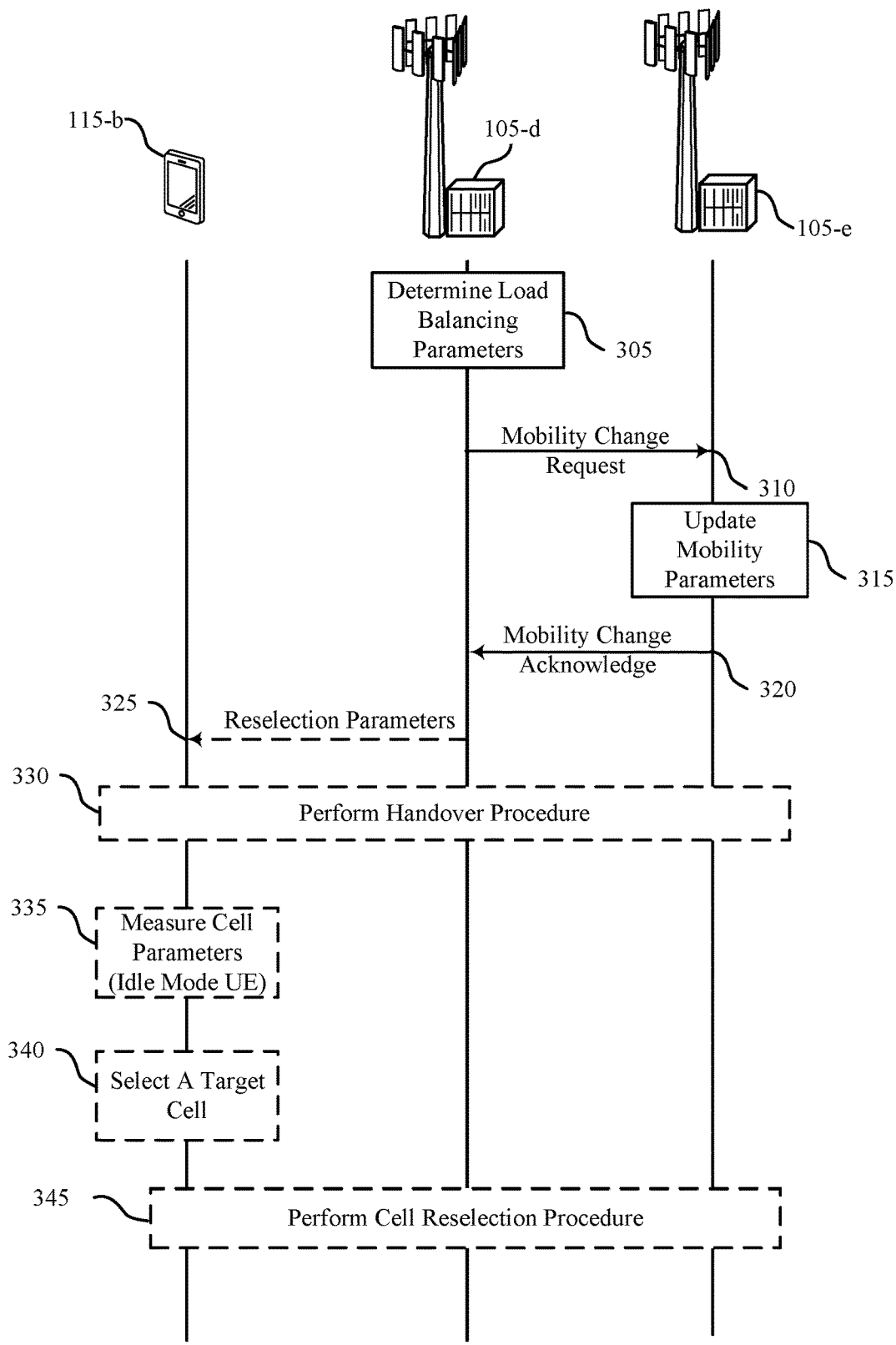
FIG. 3 illustrates an example of a process flow that supports enhancements to mobility settings change procedures in accordance with aspects of the present disclosure.

FIG. 3 illustrates an example of a process flow 300 that supports enhancements to mobility settings change procedures in accordance with aspects of the present disclosure. In some examples, process flow 300 may implement aspects of wireless communications system 100 or 200. For example, the process flow 300 may include a UE 115-b, a first base station 105-d (e.g., a source base station, source cell, or source node), and a second base station 105-e (e.g., a target base station, target cell, or target node), which may be examples of a base station 105 and UE 115 as described with reference to FIGS. 1 and 2. Additionally, one or more of the base stations 105 may be an example of a CU, DU, CU-UP, CU-CP, or other node. In some examples, a wireless communication system may support event-triggered MLB. Base stations 105 may implement one or more techniques described herein. Alternative examples of the following may be implemented, where steps are performed in a different order than described or are not performed at all. In some cases, steps may include additional features not mentioned below, or further steps may be added.

In the example of FIG. 3, at 305, the first base station 105-d may determine load balancing parameters. In some cases, the load balancing parameters may be determined based on a current or anticipated traffic load or pattern that is expected at the first base station 105-d. Further, the load balancing parameters may be determined at a cell level, cell area level, beam level, network slice level, or any combinations thereof. Based on the load balancing parameters, the first base station 105-d may determine one or more updated parameters that may be identified to provide an enhanced distribution of traffic between the first base station 105-d and the second base station 105-e, and optionally between one or more other base stations.

At 310, the first base station 105-d may transmit a mobility change request to the second base station 105-e. In some cases, the mobility change request may be a message that is transmitted that includes one or more information elements (IEs) that indicate one or more parameters for handovers of the UE 115-b between the first base station 105-d and the second base station 105-e. In some cases, the mobility change request may include a cell ID for the source cell, a cell ID for the target cell, a SSB ID list for the source cell, a SSB ID list for the second cell, a slice ID, or any combinations thereof. Further, the mobility change request, in some cases, may include information for updating one or more conditional handover parameters. In conditional handover, multiple target cells may be prepared based on a conditional handover preparation threshold and a target cell is selected based on a conditional handover execution threshold. In such cases, the mobility change request may include one or more parameters for a conditional handover preparation trigger change, a conditional handover execution trigger change, or any combinations thereof. Such conditional handover parameters may impact offloading UEs which are configured with conditional handover, such that conditional handover and regular handover boundaries can be different and the associated offsets may be separately adjusted.

In some cases, the mobility change request may include a number of mobility parameters (e.g., NG-RAN1 Mobility Parameters) associated with the first base station 105-d, which may include parameters for a handover trigger change, a conditional handover preparation trigger change, a condition handover execution trigger change, one or more reselection parameters change. Additionally, mobility change request may include one or more of such parameters for the second base station 105-e (e.g., NG-RAN2 proposed mobility parameters, which may include parameters for handover trigger change, conditional handover preparation/execution trigger changes, reselection parameters change, or combinations thereof).

In cases where reselection parameter changes are provided, such parameters may be selected to provide that when the UE 115-a comes out of idle mode, a cell is selected to provide more uniform load balancing. Such cell reselection parameters may include, for example, SnonintrasearchP, SnonintrasearchQ, SintrasearchP, SintrasearchQ, and q-OffsetCell parameters that may be signaled in system information blocks (SIBs) in accordance with NR standards, and that dictate how the UE 115-b reselects to a new cell in IDLE/INACTIVE state. Load Balancing due to mobility settings change also affects reselection parameters and thus the mobility change request may include information for reselection parameters change.

Additionally or alternatively, as discussed herein, load balancing for certain slices may be provided for deployments that implement different slice IDs for different applications such as eMBB and URLLC. In such cases, the mobility change request may include a slide ID parameter that may be used to adjust mobility/reselection parameters for a certain slice ID for slice level load balancing.

At 315, the second base station 105-e may receive the mobility change request and may update mobility parameters based on the information in the mobility change request. In some cases, the second base station 105-e may determine that the updated parameters are compatible with operations of the second base station 105-e. At 320, the second base station 105-e may then transmit a mobility change acknowledge message to the first base station 105-d to acknowledge the updated mobility parameters. In other cases, such as discussed with reference to the example of FIG. 4, the second base station 105-e may determine that one or more of the updated parameters are not compatible with operations at the second base station 105-e, which may prompt a mobility change failure message.

Following the mobility change acknowledgment, the first base station 105-d and the second base station 105-e may use the updated mobility parameters for handover execution. In some cases at 325, the first base station 105-d may optionally transmit updated reselection parameters to the UE 115-b (e.g., in one or more SIBs). At 330, the UE 115-b, first base station 105-d, and the second base station 105-e may perform handover procedures in accordance with the updated mobility parameters.

In some cases, the UE 115-b may transition to an idle mode, and may use the updated reselection parameters when transitioning out of the idle mode. In such cases, at 335, the UE 115-b may measure one or more cell parameters. At 340, in such cases, the UE 115-b may select a target cell based on the reselection parameters. At 345, in such cases, the UE 115-b may perform a cell reselection procedure to connect with one of the first base station 105-d or the second base station 105-e.

Figure 4:
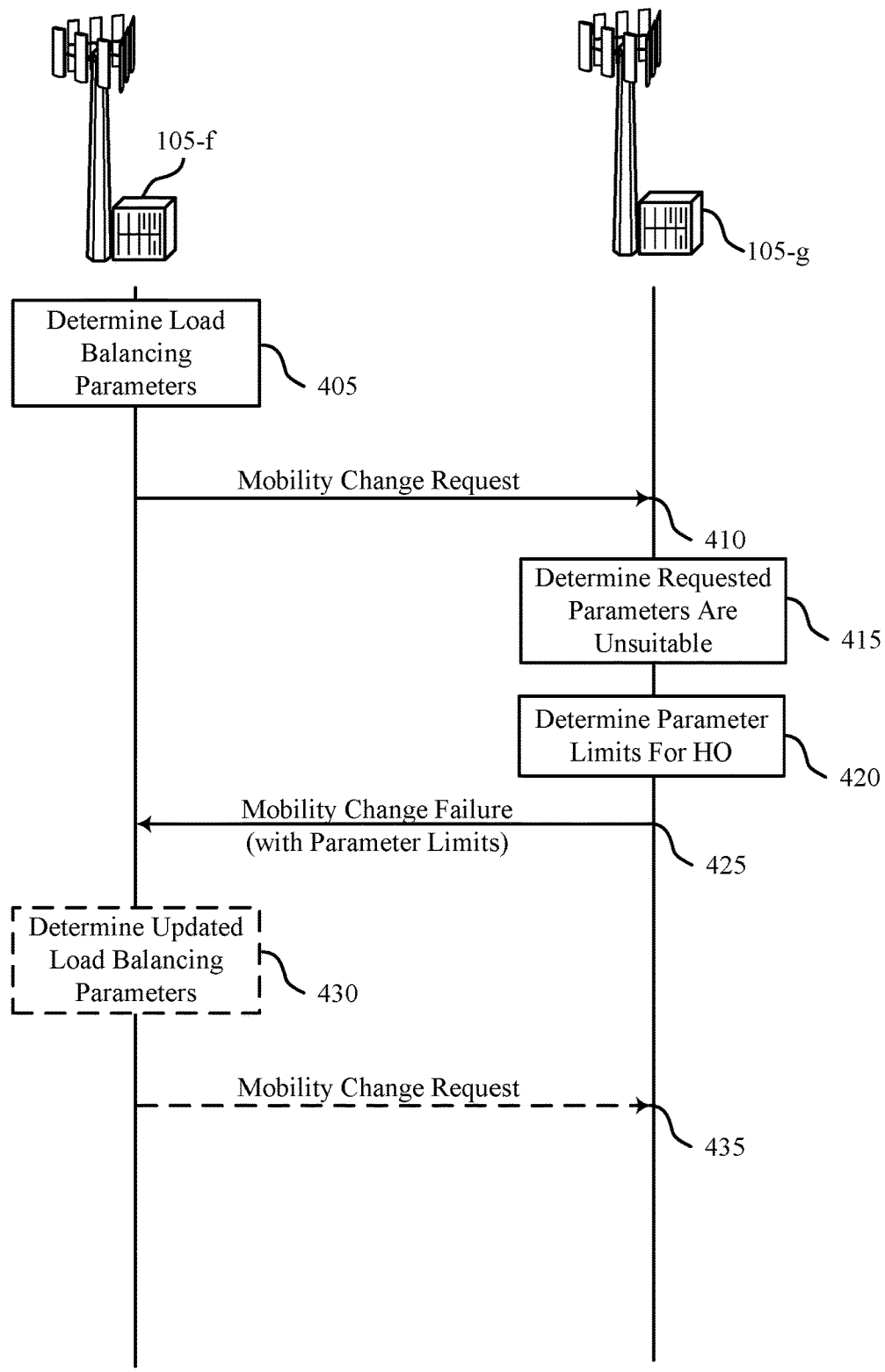
FIG. 4 illustrates an example of a process flow that supports enhancements to mobility settings change procedures in accordance with aspects of the present disclosure.

FIG. 4 illustrates an example of a process flow 400 that supports enhancements to mobility settings change procedures in accordance with aspects of the present disclosure. In some examples, process flow 400 may implement aspects of wireless communications system 100 or 200. For example, the process flow 400 may include a first base station 105-f (e.g., a source base station, source cell, or source node), and a second base station 105-g (e.g., a target base station, target cell, or target node), which may be examples of a base station 105 as described with reference to FIGS. 1 and 2. Additionally, one or more of the base stations 105 may be an example of a CU, DU, CU-UP, CU-CP, or other node. In some examples, a wireless communication system may support event-triggered MLB. Base stations 105 may implement one or more techniques described herein. Alternative examples of the following may be implemented, where steps are performed in a different order than described or are not performed at all. In some cases, steps may include additional features not mentioned below, or further steps may be added.

In the example of FIG. 4, at 405, the first base station 105-f may determine load balancing parameters. In some cases, the load balancing parameters may be determined based on a current or anticipated traffic load or pattern that is expected at the first base station 105-f. Further, the load balancing parameters may be determined at a cell level, cell area level, beam level, network slice level, or any combinations thereof. Based on the load balancing parameters, the first base station 105-f may determine one or more updated parameters that may be identified to provide an enhanced distribution of traffic between the first base station 105-f and the second base station 105-g, and optionally between one or more other base stations.

At 410, the first base station 105-f may transmit a mobility change request to the second base station 105-g. In some cases, the mobility change request may be a message that is transmitted that includes one or more information elements (IEs) that indicate one or more parameters for handovers of UEs between the first base station 105-f and the second base station 105-g, which may include parameters such as discussed with reference to FIG. 3.

At 415, the second base station 105-g may determine that one or more of the updated mobility parameters are unsuitable for operations at the second base station 105-g. For example, the second base station 105-g may have one or more constraints that impact an amount of traffic that may be supported, and one or more of the updated mobility parameters may result in the second base station 105-g determining that such a change would result in a traffic level that is not compatible with the one or more constraints.

At 420, the second base station 105-g may determine one or more parameter limits for handover. The one or more parameter limits may be determined based on an amount of traffic that the second base station 105-g is able to support.

At 425, the second base station 105-g may transmit a mobility change failure to the first base station 105-f. In some cases, the mobility change failure message may indicate one or more thresholds or limits for parameter changes of one or more mobility parameters. For example, the mobility change failure message may indicate an allowed delta range for handover trigger parameters (e.g., handover trigger change lower and upper limits), where changes on the handover or reselection parameters are to be within this range. In some cases, the mobility change failure message may provide upper and lower limits for conditional handover preparation trigger, conditional handover execution trigger, reselection parameters trigger, or any combinations whereon. Further, such information may be provided as beam level information (e.g., NG-RAN1 SSB ID List and NG-RAN2 SSB ID List), as slice ID information, or combinations thereof, in cases where load balancing is done per beam or slice level. In some examples, the mobility change failure message may include parameters for one or more of NG-RAN1 Cell ID, NG-RAN2 Cell ID, NG-RAN1 SSB ID List, NG-RAN2 SSB ID List, Slice ID, Mobility Parameters Modification Range with Handover Trigger Change Lower/Upper Limit, CHO Preparation Trigger Change Lower/Upper Limit, CHO Execution Trigger Change Lower/Upper Limit, Reselection Parameters Trigger Change Lower/Upper Limit, or any combinations thereof.

Optionally, at 430, the first base station 105-f may determine updated load balancing parameters based on the information from the mobility change failure message. At 435, the first base station 105-f may, in such cases, transmit a subsequent mobility change request that includes one or more updated mobility parameters that are based on the limits indicated by the second base station 105-g.

Figure 5:
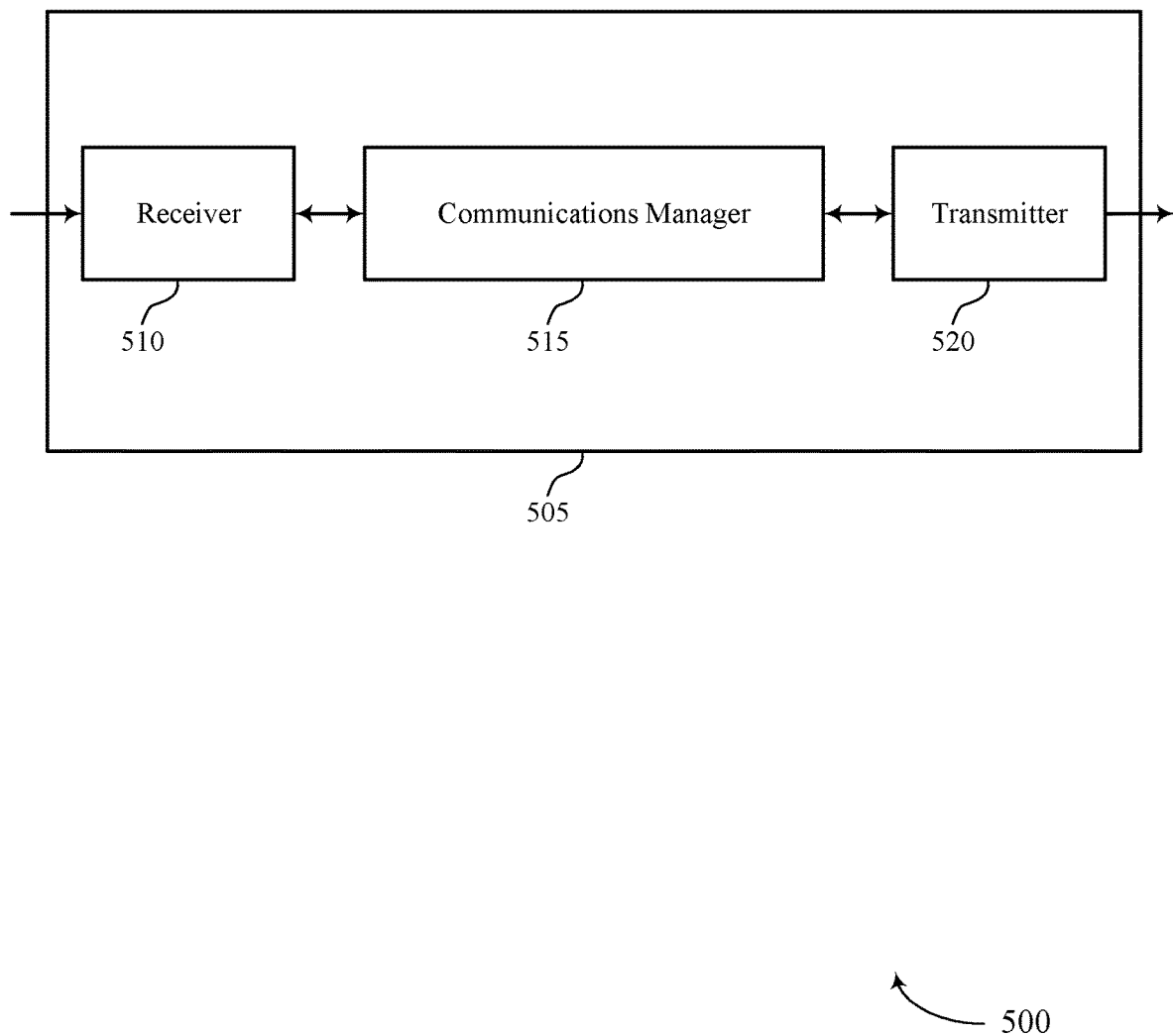
FIGS. 5 and 6 show block diagrams of devices that support enhancements to mobility settings change procedures in accordance with aspects of the present disclosure.

FIG. 5 shows a block diagram 500 of a device 505 that supports enhancements to mobility settings change procedures in accordance with aspects of the present disclosure. The device 505 may be an example of aspects of a base station 105 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to enhancements to mobility settings change procedures, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may determine a load balancing adjustment to be applied to one or more beams of a set of beams, one or more network slice identifications of a set of network slice identifications, or combinations thereof, for determining a handover of at least one UE from the first base station to a second base station, format, based on the determining, a mobility change request that indicates one or more parameters that are updated to provide the load balancing adjustment for the one or more beams, one or more network slice identifications, or combinations thereof, and transmit the mobility change request to the second base station.

The communications manager 515 may also identify, for at least a first UE with an established connection with the first base station, a conditional handover parameter for a conditional handover of the first UE from the first base station to a second base station, where the conditional handover is triggered based on a first parameter associated with the first UE, determine, a conditional handover trigger adjustment to be applied to the first parameter based on a load balancing procedure at the first base station, and transmit an indication of the conditional handover trigger adjustment to the second base station. The communications manager 515 may be an example of aspects of the communications manager 810 described herein.

The communications manager 515 as described herein may be implemented to realize one or more potential advantages. One implementation may allow the device 505 to more efficiently determine and communicate mobility change parameters, which may provide for more efficient communications through enhanced load balancing. Enhanced load balancing may support improvements in the communication network, decrease signaling overhead, and improve reliability, among other advantages. As such, supported techniques may include improved network operations and, in some examples, may promote network efficiencies, reduce latency, and provide network power savings, among other benefits.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
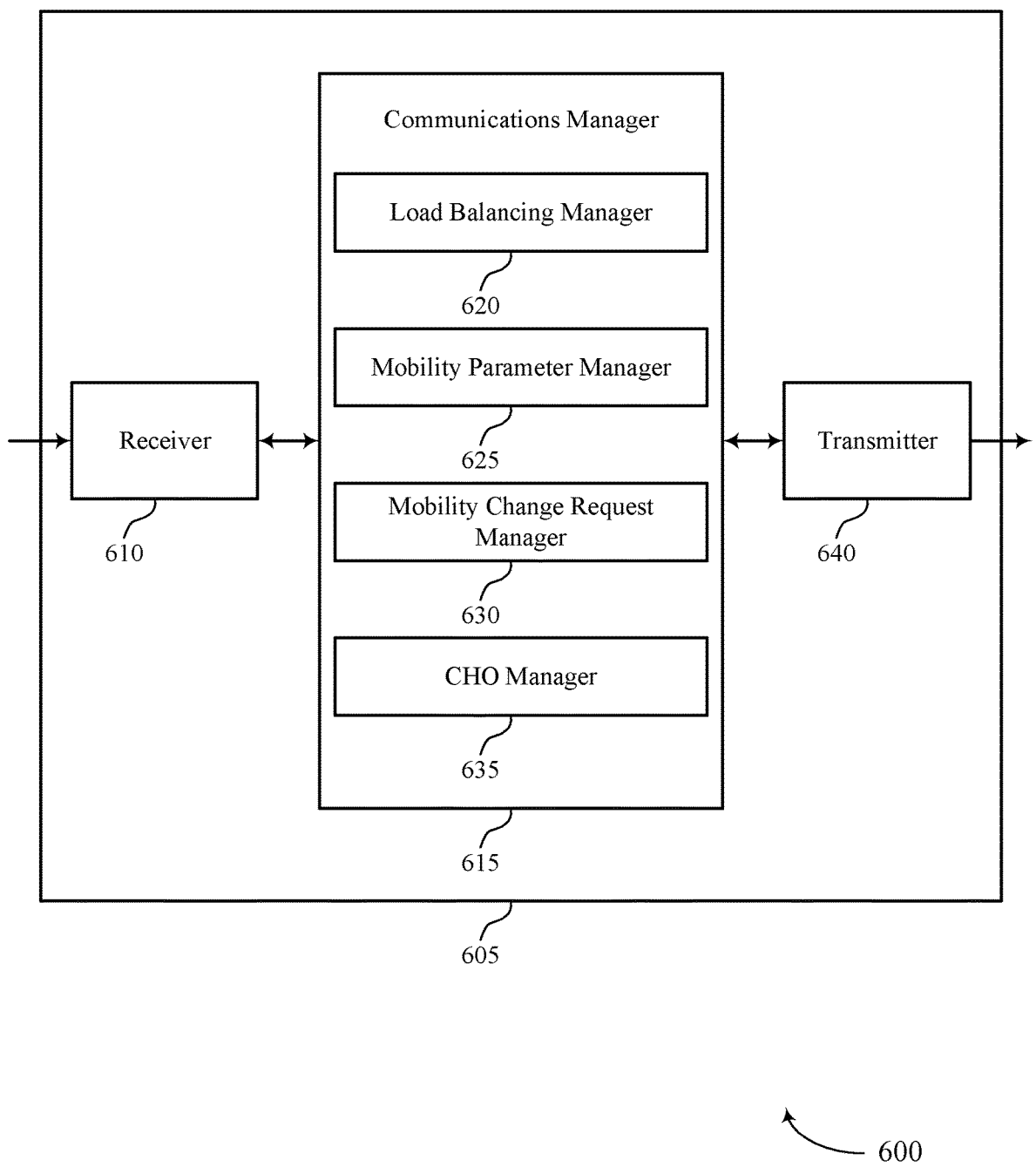

FIG. 6 shows a block diagram 600 of a device 605 that supports enhancements to mobility settings change procedures in accordance with aspects of the present disclosure. The device 605 may be an example of aspects of a device 505, or a base station 105 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to enhancements to mobility settings change procedures, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a load balancing manager 620, a mobility parameter manager 625, a mobility change request manager 630, and a CHO manager 635. The communications manager 615 may be an example of aspects of the communications manager 810 described herein.

In some cases, the load balancing manager 620 may determine a load balancing adjustment to be applied to one or more beams of a set of beams, one or more network slice identifications of a set of network slice identifications, or combinations thereof, for determining a handover of at least one UE from the first base station to a second base station. The mobility parameter manager 625 may format, based on the determining, a mobility change request that indicates one or more parameters that are updated to provide the load balancing adjustment for the one or more beams, one or more network slice identifications, or combinations thereof. The mobility change request manager 630 may transmit the mobility change request to the second base station.

In some cases, the mobility parameter manager 625 may identify, for at least a first UE with an established connection with the first base station, a conditional handover parameter for a conditional handover of the first UE from the first base station to a second base station, where the conditional handover is triggered based on a first parameter associated with the first UE. The CHO manager 635 may determine, a conditional handover trigger adjustment to be applied the first parameter based on a load balancing procedure at the first base station. The mobility change request manager 630 may transmit an indication of the conditional handover trigger adjustment to the second base station.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
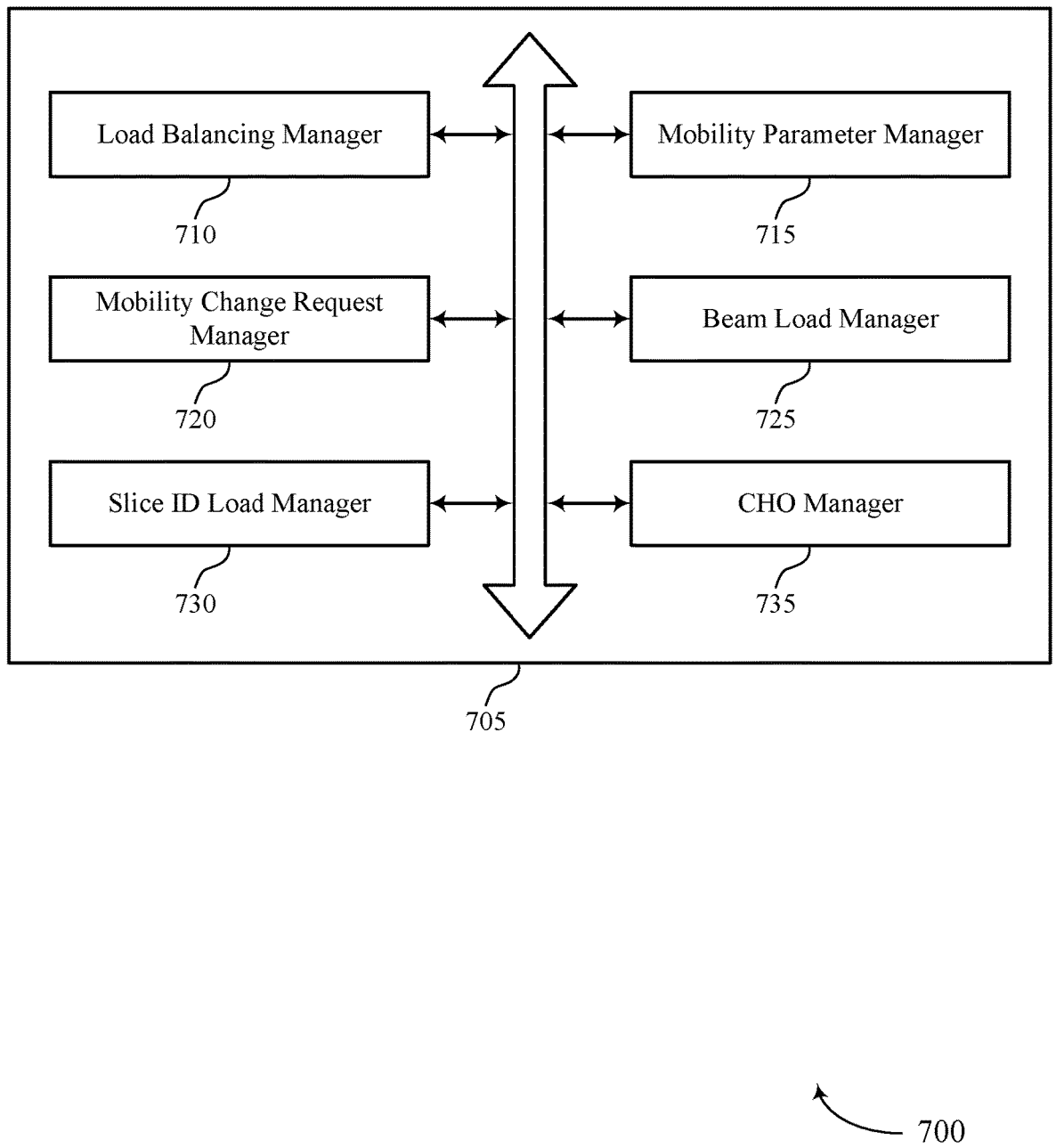
FIG. 7 shows a block diagram of a communications manager that supports enhancements to mobility settings change procedures in accordance with aspects of the present disclosure.

FIG. 7 shows a block diagram 700 of a communications manager 705 that supports enhancements to mobility settings change procedures in accordance with aspects of the present disclosure. The communications manager 705 may be an example of aspects of a communications manager 515, a communications manager 615, or a communications manager 810 described herein. The communications manager 705 may include a load balancing manager 710, a mobility parameter manager 715, a mobility change request manager 720, a beam load manager 725, a slice ID load manager 730, and a CHO manager 735. Each of these modules may communicate, directly or indirectly, with one another (e.g., via one or more buses).

The load balancing manager 710 may determine a load balancing adjustment to be applied to one or more beams of a set of beams, one or more network slice identifications of a set of network slice identifications, or combinations thereof, for determining a handover of at least one UE from the first base station to a second base station.

The mobility parameter manager 715 may format, based on the determining, a mobility change request that indicates one or more parameters that are updated to provide the load balancing adjustment for the one or more beams, one or more network slice identifications, or combinations thereof. In some examples, the mobility parameter manager 715 may identify, for at least a first UE with an established connection with the first base station, a conditional handover parameter for a conditional handover of the first UE from the first base station to a second base station, where the conditional handover is triggered based on a first parameter associated with the first UE. In some examples, the mobility parameter manager 715 may configure one or more reselection parameters that indicate how the at least one UE is to reselect to a new cell when in an idle or inactive state. In some cases, the one or more reselection parameters are to be provided to the at least one UE in a SIB communication from the first base station or the second base station. In some cases, the mobility change request indicates a difference from a previous value of the one or more parameters based on the load balancing adjustment.

In some examples, the mobility parameter manager 715 may receive, from the second base station, a mobility change failure response that indicates one or more of a change limit for one or more parameters, one or more associated beams, one or more associated slice IDs, or combinations thereof, that are associated with the second base station. In some examples, the mobility parameter manager 715 may configure one or more reselection parameters that indicate how at least the first UE is to reselect to a new cell when in an idle or inactive state. In some cases, the one or more reselection parameters are to be provided to the at least one UE in a SIB communication from the first base station or the second base station. In some cases, the change limit for one or more parameters indicates an upper limit for a conditional handover to the second base station, a lower limit for a conditional handover to the second base station, or any combinations thereof. In some cases, the mobility change failure response includes at least one information element that indicates one or more available beam identifications, slice identification, or combinations thereof, associated with the second base station.

The mobility change request manager 720 may transmit the mobility change request to the second base station. In some examples, the mobility change request manager 720 may transmit an indication of the conditional handover trigger adjustment to the second base station. In some examples, the mobility change request manager 720 may transmit the indication of the conditional handover trigger adjustment in a mobility change request.

The CHO manager 735 may determine, a conditional handover trigger adjustment to be applied the first parameter based on a load balancing procedure at the first base station. In some examples, the CHO manager 735 may identify one or more updated parameters for a conditional handover, where the one or more updated parameters are associated with conditions for executing operations associated with the handover of the at least one UE from the first base station to the second base station. In some cases, the one or more updated parameters for the conditional handover indicate one or more conditional handover preparation parameter thresholds that indicate when a target cell is to be prepared for a handover, one or more conditional handover execution parameter thresholds that indicate that the target cell is to be selected for the handover, or any combinations thereof. In some cases, the one or more updated parameters for conditional handover are different than non-conditional handover parameters and are adjusted independently of the non-conditional handover parameters. In some cases, the mobility change request includes values for one or more of a conditional handover preparation trigger threshold, a conditional handover execution trigger threshold, one or more reselection parameters, or any combinations thereof.

The beam load manager 725 may format an information element with a first beam identification list that indicates one or more beams associated with the first base station and a second beam identification list that indicates one or more beams associated with the second base station. In some cases, the first beam identification list and the second beam identification list each include one or more synchronization signal blocks (SSBs) associated with the mobility change request.

The slice ID load manager 730 may format an information element with a first slice identification associated with the first base station and a second slice identification associated with the second base station. In some cases, the first slice identification and the second slice identification are associated with URLLC transmissions, eMBB transmissions, or mMTC transmissions.

Figure 8:
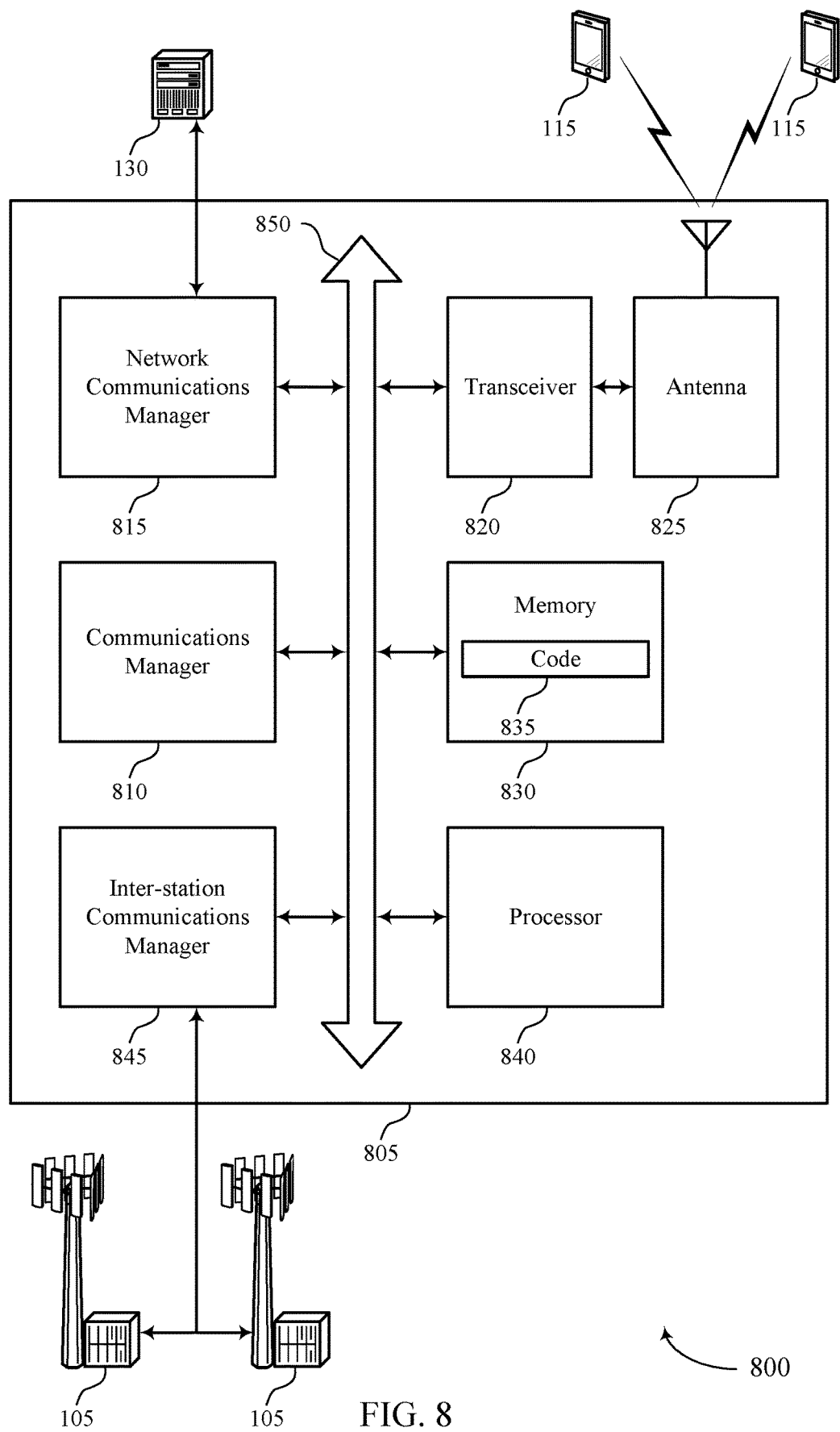
FIG. 8 shows a diagram of a system including a device that supports enhancements to mobility settings change procedures in accordance with aspects of the present disclosure.

FIG. 8 shows a diagram of a system 800 including a device 805 that supports enhancements to mobility settings change procedures in accordance with aspects of the present disclosure. The device 805 may be an example of or include the components of device 505, device 605, or a base station 105 as described herein. The device 805 may include components for bi-directional voice and data communications including components for transmitting and receiving communications, including a communications manager 810, a network communications manager 815, a transceiver 820, an antenna 825, memory 830, a processor 840, and an inter-station communications manager 845. These components may be in electronic communication via one or more buses (e.g., bus 850).

The communications manager 810 may determine a load balancing adjustment to be applied to one or more beams of a set of beams, one or more network slice identifications of a set of network slice identifications, or combinations thereof, for determining a handover of at least one UE from the first base station to a second base station, format, based on the determining, a mobility change request that indicates one or more parameters that are updated to provide the load balancing adjustment for the one or more beams, one or more network slice identifications, or combinations thereof, and transmit the mobility change request to the second base station.

The communications manager 810 may also identify, for at least a first UE with an established connection with the first base station, a conditional handover parameter for a conditional handover of the first UE from the first base station to a second base station, where the conditional handover is triggered based on a first parameter associated with the first UE, determine, a conditional handover trigger adjustment to be applied the first parameter based on a load balancing procedure at the first base station, and transmit an indication of the conditional handover trigger adjustment to the second base station.

The communications manager 810 as described herein may be implemented to realize one or more potential advantages. One implementation may allow the device 805 to more efficiently determine and communicate mobility change parameters, which may provide for more efficient communications through enhanced load balancing. Enhanced load balancing may support improvements in the communication network, decrease signaling overhead, and improve reliability, among other advantages. As such, supported techniques may include improved network operations and, in some examples, may promote network efficiencies, reduce latency, and provide network power savings, among other benefits The network communications manager 815 may manage communications with the core network (e.g., via one or more wired backhaul links). For example, the network communications manager 815 may manage the transfer of data communications for client devices, such as one or more UEs 115.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM, ROM, or a combination thereof. The memory 830 may store computer-readable code 835 including instructions that, when executed by a processor (e.g., the processor 840) cause the device to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some cases, a memory controller may be integrated into processor 840. The processor 840 may be configured to execute computer-readable instructions stored in a memory (e.g., the memory 830) to cause the device 805 to perform various functions (e.g., functions or tasks supporting enhancements to mobility settings change procedures).

The inter-station communications manager 845 may manage communications with other base station 105, and may include a controller or scheduler for controlling communications with UEs 115 in cooperation with other base stations 105. For example, the inter-station communications manager 845 may coordinate scheduling for transmissions to UEs 115 for various interference mitigation techniques such as beamforming or joint transmission. In some examples, the inter-station communications manager 845 may provide an X2 interface within an LTE/LTE-A wireless communication network technology to provide communication between base stations 105.

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
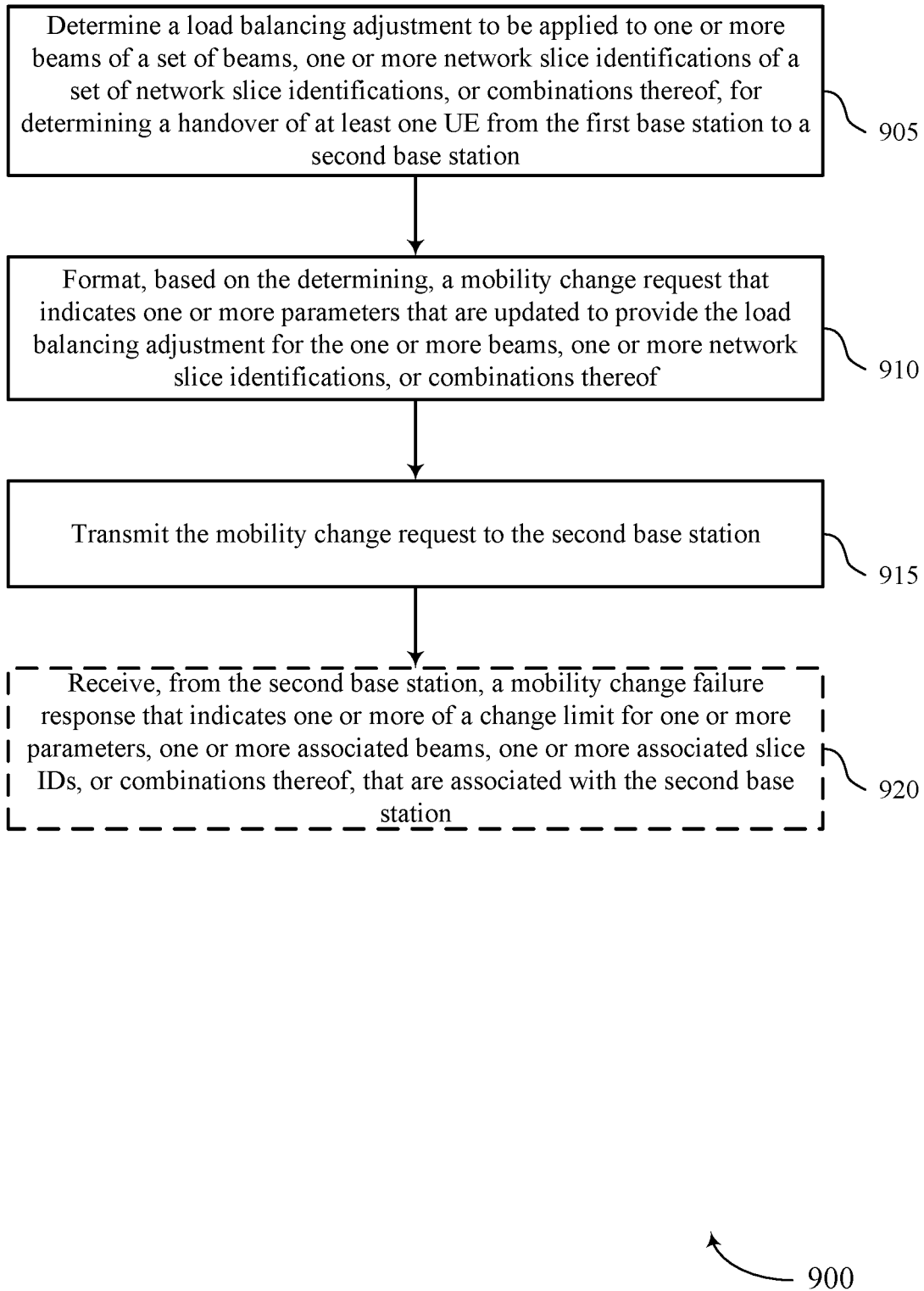
FIGS. 9 through 15 show flowcharts illustrating methods that support enhancements to mobility settings change procedures in accordance with aspects of the present disclosure.

FIG. 9 shows a flowchart illustrating a method 900 that supports enhancements to mobility settings change procedures in accordance with aspects of the present disclosure. The operations of method 900 may be implemented by a base station 105 or its components as described herein. For example, the operations of method 900 may be performed by a communications manager as described with reference to FIGS. 5 through 8. In some examples, a base station may execute a set of instructions to control the functional elements of the base station to perform the functions described below. Additionally or alternatively, a base station may perform aspects of the functions described below using special-purpose hardware.

At 905, the base station may determine a load balancing adjustment to be applied to one or more beams of a set of beams, one or more network slice identifications of a set of network slice identifications, or combinations thereof, for determining a handover of at least one UE from the first base station to a second base station. The operations of 905 may be performed according to the methods described herein. In some examples, aspects of the operations of 905 may be performed by a load balancing manager as described with reference to FIGS. 5 through 8.

At 910, the base station may format, based on the determining, a mobility change request that indicates one or more parameters that are updated to provide the load balancing adjustment for the one or more beams, one or more network slice identifications, or combinations thereof. The operations of 910 may be performed according to the methods described herein. In some examples, aspects of the operations of 910 may be performed by a mobility parameter manager as described with reference to FIGS. 5 through 8.

At 915, the base station may transmit the mobility change request to the second base station. The operations of 915 may be performed according to the methods described herein. In some examples, aspects of the operations of 915 may be performed by a mobility change request manager as described with reference to FIGS. 5 through 8.

Optionally, at 920, the base station may receive, from the second base station, a mobility change failure response that indicates one or more of a change limit for one or more parameters, one or more associated beams, one or more associated slice IDs, or combinations thereof, that are associated with the second base station. The operations of 920 may be performed according to the methods described herein. In some examples, aspects of the operations of 920 may be performed by a mobility parameter manager as described with reference to FIGS. 5 through 8. In some cases, the change limit for one or more parameters indicates an upper limit for a conditional handover to the second base station, a lower limit for a conditional handover to the second base station, or any combinations thereof. In some cases, the mobility change failure response includes at least one information element that indicates one or more available beam identifications, slice identification, or combinations thereof, associated with the second base station.

Figure 10:
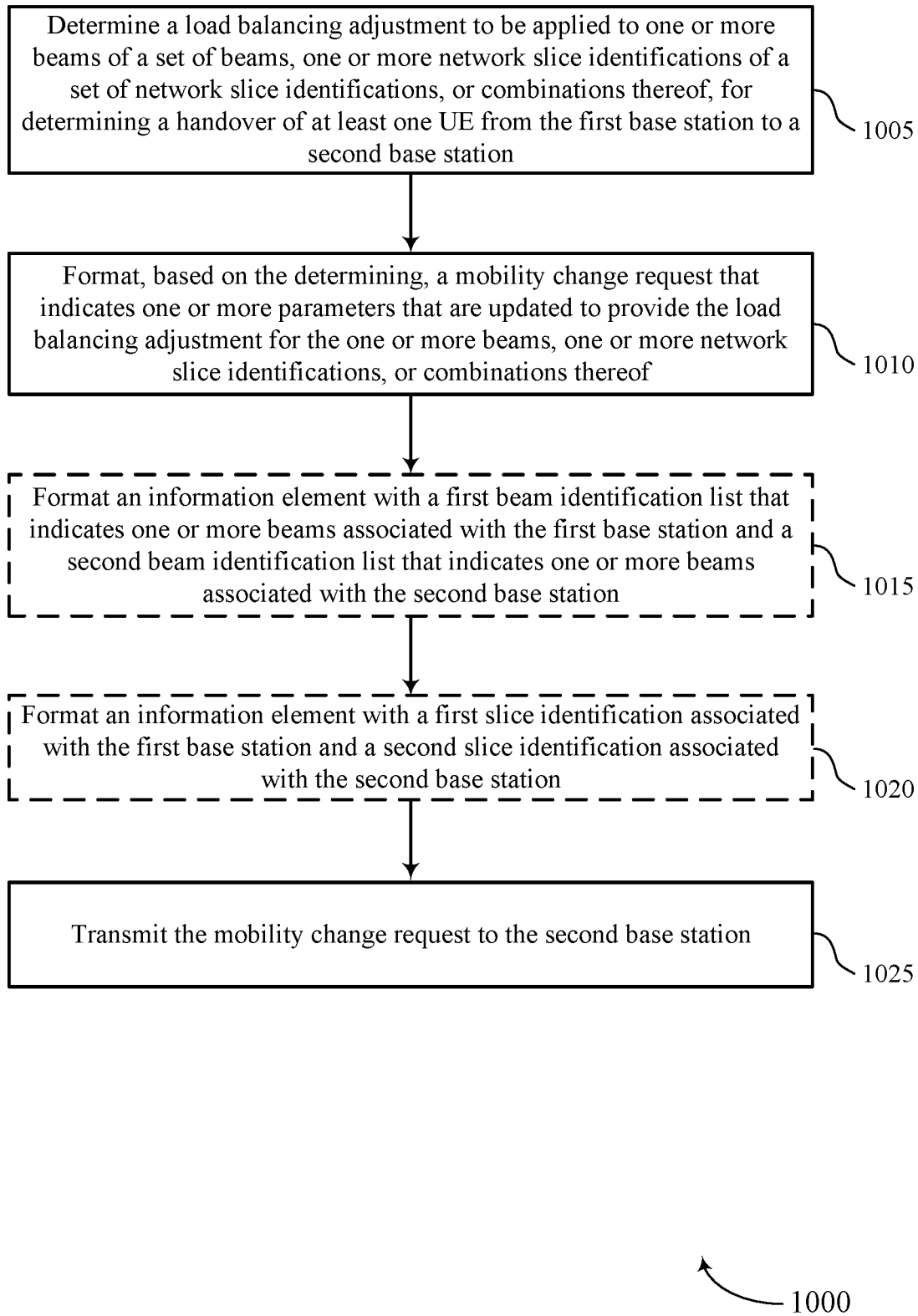

FIG. 10 shows a flowchart illustrating a method 1000 that supports enhancements to mobility settings change procedures in accordance with aspects of the present disclosure. The operations of method 1000 may be implemented by a base station 105 or its components as described herein. For example, the operations of method 1000 may be performed by a communications manager as described with reference to FIGS. 5 through 8. In some examples, a base station may execute a set of instructions to control the functional elements of the base station to perform the functions described below. Additionally or alternatively, a base station may perform aspects of the functions described below using special-purpose hardware.

At 1005, the base station may determine a load balancing adjustment to be applied to one or more beams of a set of beams, one or more network slice identifications of a set of network slice identifications, or combinations thereof, for determining a handover of at least one UE from the first base station to a second base station. The operations of 1005 may be performed according to the methods described herein. In some examples, aspects of the operations of 1005 may be performed by a load balancing manager as described with reference to FIGS. 5 through 8.

At 1010, the base station may format, based on the determining, a mobility change request that indicates one or more parameters that are updated to provide the load balancing adjustment for the one or more beams, one or more network slice identifications, or combinations thereof. The operations of 1010 may be performed according to the methods described herein. In some examples, aspects of the operations of 1010 may be performed by a mobility parameter manager as described with reference to FIGS. 5 through 8.

In some cases, at 1015, the base station may format an information element with a first beam identification list that indicates one or more beams associated with the first base station and a second beam identification list that indicates one or more beams associated with the second base station. The operations of 1015 may be performed according to the methods described herein. In some examples, aspects of the operations of 1015 may be performed by a beam load manager as described with reference to FIGS. 5 through 8. In some cases, the first beam identification list and the second beam identification list each include one or more SSBs associated with the mobility change request.

In some cases, at 1020, the base station may format an information element with a first slice identification associated with the first base station and a second slice identification associated with the second base station. The operations of 1020 may be performed according to the methods described herein. In some examples, aspects of the operations of 1020 may be performed by a slice ID load manager as described with reference to FIGS. 5 through 8. In some cases, the first slice identification and the second slice identification are associated with URLLC transmissions, eMBB transmissions, or mMTC transmissions.

At 1025, the base station may transmit the mobility change request to the second base station. The operations of 1025 may be performed according to the methods described herein. In some examples, aspects of the operations of 1025 may be performed by a mobility change request manager as described with reference to FIGS. 5 through 8.

Figure 11:
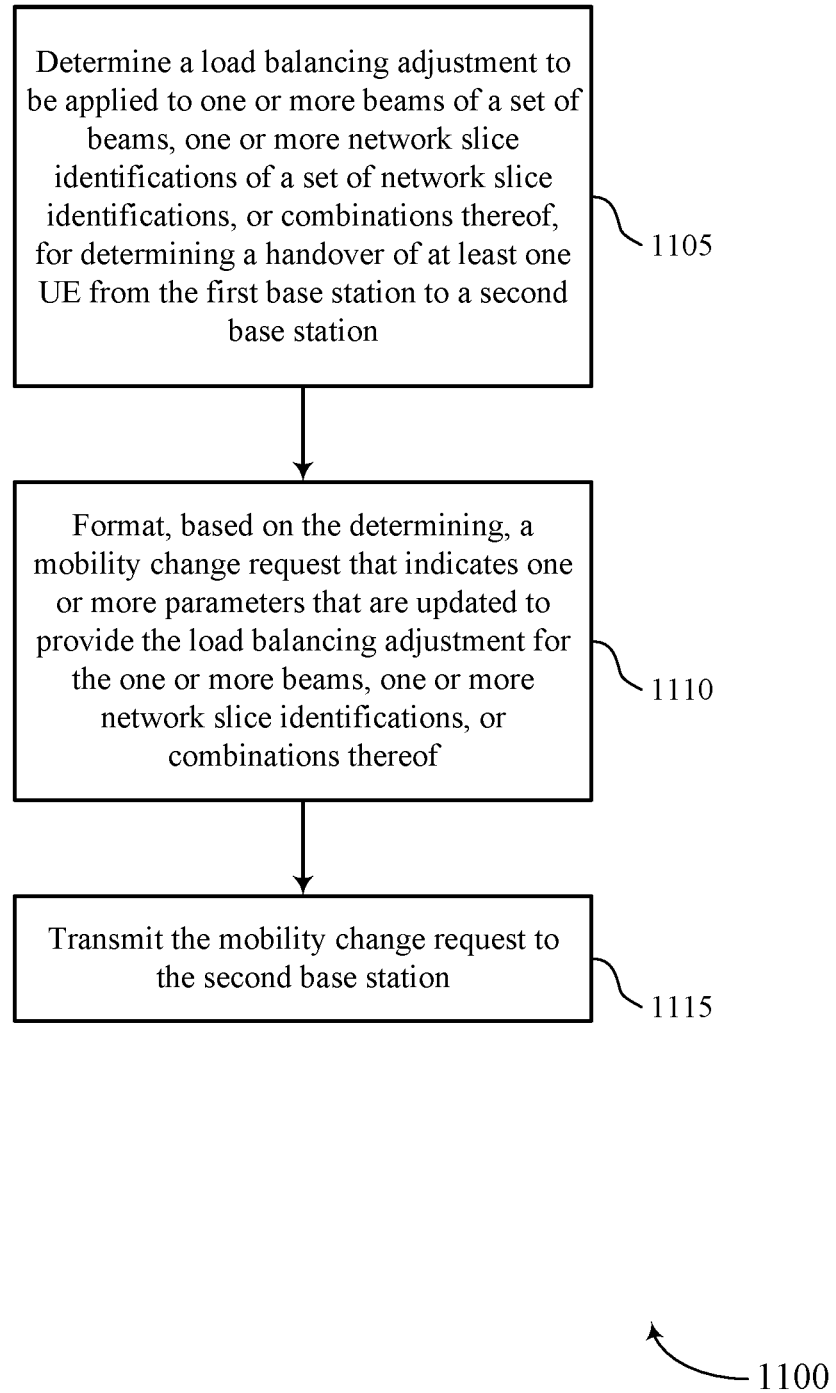

FIG. 11 shows a flowchart illustrating a method 1100 that supports enhancements to mobility settings change procedures in accordance with aspects of the present disclosure. The operations of method 1100 may be implemented by a base station 105 or its components as described herein. For example, the operations of method 1100 may be performed by a communications manager as described with reference to FIGS. 5 through 8. In some examples, a base station may execute a set of instructions to control the functional elements of the base station to perform the functions described below. Additionally or alternatively, a base station may perform aspects of the functions described below using special-purpose hardware.

At 1105, the base station may determine a load balancing adjustment to be applied to one or more beams of a set of beams, one or more network slice identifications of a set of network slice identifications, or combinations thereof, for determining a handover of at least one UE from the first base station to a second base station. The operations of 1105 may be performed according to the methods described herein. In some examples, aspects of the operations of 1105 may be performed by a load balancing manager as described with reference to FIGS. 5 through 8.

At 1110, the base station may format, based on the determining, a mobility change request that indicates one or more parameters that are updated to provide the load balancing adjustment for the one or more beams, one or more network slice identifications, or combinations thereof. The operations of 1110 may be performed according to the methods described herein. In some examples, aspects of the operations of 1110 may be performed by a mobility parameter manager as described with reference to FIGS. 5 through 8.

At 1115, the base station may transmit the mobility change request to the second base station. The operations of 1115 may be performed according to the methods described herein. In some examples, aspects of the operations of 1115 may be performed by a mobility change request manager as described with reference to FIGS. 5 through 8.

Figure 12:
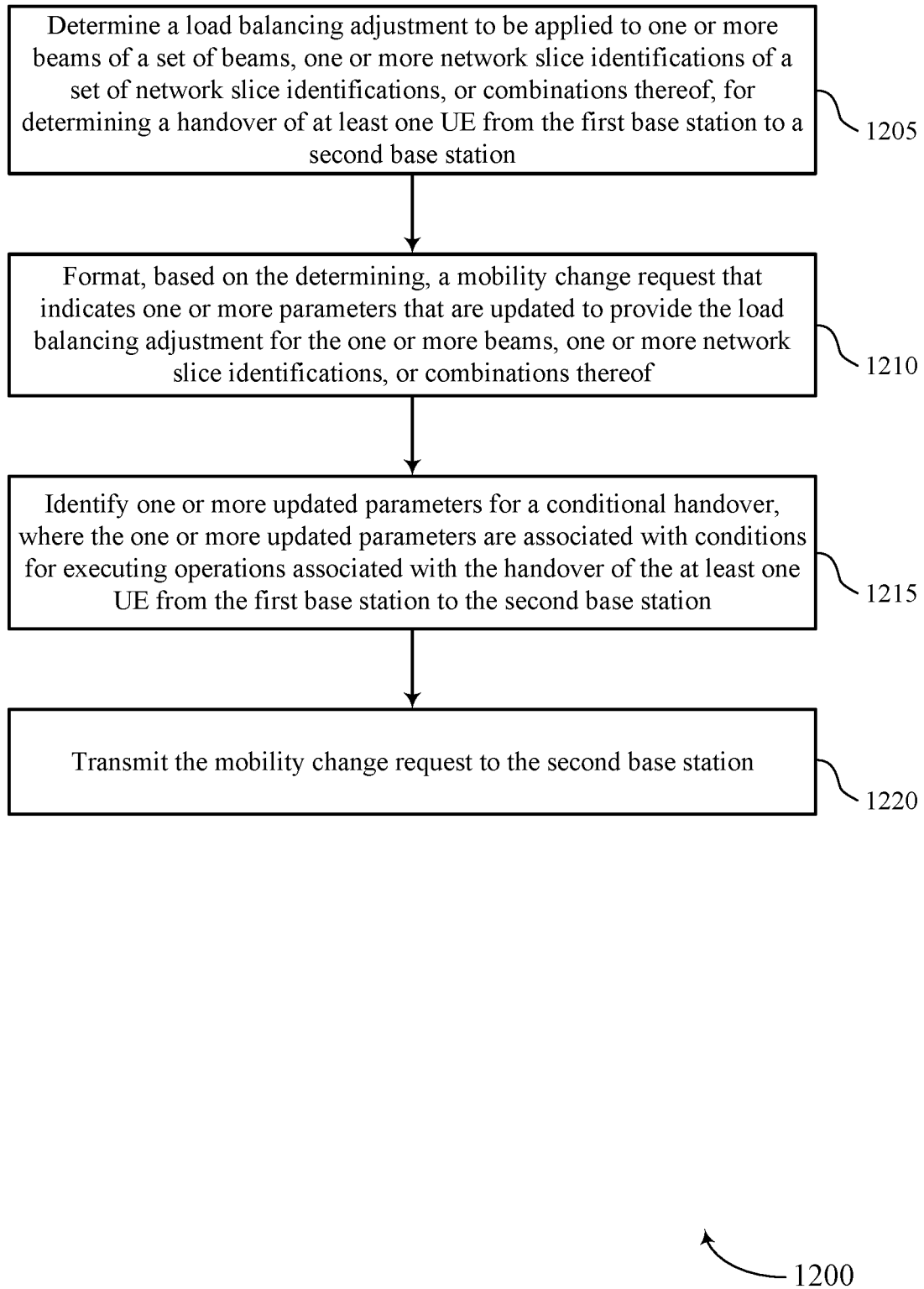

FIG. 12 shows a flowchart illustrating a method 1200 that supports enhancements to mobility settings change procedures in accordance with aspects of the present disclosure. The operations of method 1200 may be implemented by a base station 105 or its components as described herein. For example, the operations of method 1200 may be performed by a communications manager as described with reference to FIGS. 5 through 8. In some examples, a base station may execute a set of instructions to control the functional elements of the base station to perform the functions described below. Additionally or alternatively, a base station may perform aspects of the functions described below using special-purpose hardware.

At 1205, the base station may determine a load balancing adjustment to be applied to one or more beams of a set of beams, one or more network slice identifications of a set of network slice identifications, or combinations thereof, for determining a handover of at least one UE from the first base station to a second base station. The operations of 1205 may be performed according to the methods described herein. In some examples, aspects of the operations of 1205 may be performed by a load balancing manager as described with reference to FIGS. 5 through 8.

At 1210, the base station may format, based on the determining, a mobility change request that indicates one or more parameters that are updated to provide the load balancing adjustment for the one or more beams, one or more network slice identifications, or combinations thereof. The operations of 1210 may be performed according to the methods described herein. In some examples, aspects of the operations of 1210 may be performed by a mobility parameter manager as described with reference to FIGS. 5 through 8.

At 1215, the base station may identify one or more updated parameters for a conditional handover, where the one or more updated parameters are associated with conditions for executing operations associated with the handover of the at least one UE from the first base station to the second base station. The operations of 1215 may be performed according to the methods described herein. In some examples, aspects of the operations of 1215 may be performed by a CHO manager as described with reference to FIGS. 5 through 8. In some cases, the one or more updated parameters for the conditional handover indicate one or more conditional handover preparation parameter thresholds that indicate when a target cell is to be prepared for a handover, one or more conditional handover execution parameter thresholds that indicate that the target cell is to be selected for the handover, or any combinations thereof.

At 1220, the base station may transmit the mobility change request to the second base station. The operations of 1220 may be performed according to the methods described herein. In some examples, aspects of the operations of 1220 may be performed by a mobility change request manager as described with reference to FIGS. 5 through 8.

Figure 13:
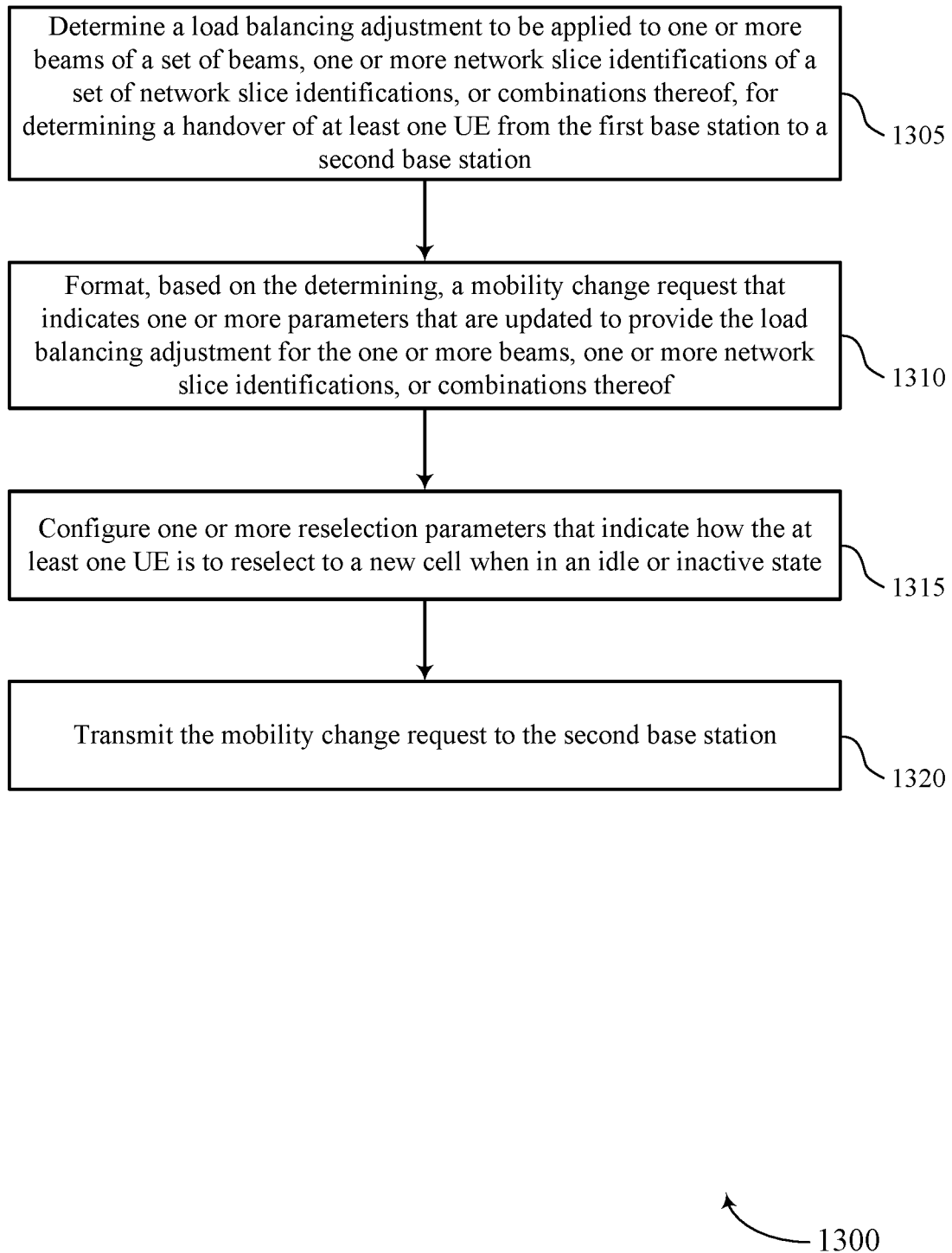

FIG. 13 shows a flowchart illustrating a method 1300 that supports enhancements to mobility settings change procedures in accordance with aspects of the present disclosure. The operations of method 1300 may be implemented by a base station 105 or its components as described herein. For example, the operations of method 1300 may be performed by a communications manager as described with reference to FIGS. 5 through 8. In some examples, a base station may execute a set of instructions to control the functional elements of the base station to perform the functions described below. Additionally or alternatively, a base station may perform aspects of the functions described below using special-purpose hardware.

At 1305, the base station may determine a load balancing adjustment to be applied to one or more beams of a set of beams, one or more network slice identifications of a set of network slice identifications, or combinations thereof, for determining a handover of at least one UE from the first base station to a second base station. The operations of 1305 may be performed according to the methods described herein. In some examples, aspects of the operations of 1305 may be performed by a load balancing manager as described with reference to FIGS. 5 through 8.

At 1310, the base station may format, based on the determining, a mobility change request that indicates one or more parameters that are updated to provide the load balancing adjustment for the one or more beams, one or more network slice identifications, or combinations thereof. The operations of 1310 may be performed according to the methods described herein. In some examples, aspects of the operations of 1310 may be performed by a mobility parameter manager as described with reference to FIGS. 5 through 8.

At 1315, the base station may configure one or more reselection parameters that indicate how the at least one UE is to reselect to a new cell when in an idle or inactive state. The operations of 1315 may be performed according to the methods described herein. In some examples, aspects of the operations of 1315 may be performed by a mobility parameter manager as described with reference to FIGS. 5 through 8. In some cases, the one or more reselection parameters are to be provided to the at least one UE in a SIB communication from the first base station or the second base station.

At 1320, the base station may transmit the mobility change request to the second base station. The operations of 1320 may be performed according to the methods described herein. In some examples, aspects of the operations of 1320 may be performed by a mobility change request manager as described with reference to FIGS. 5 through 8.

Figure 14:
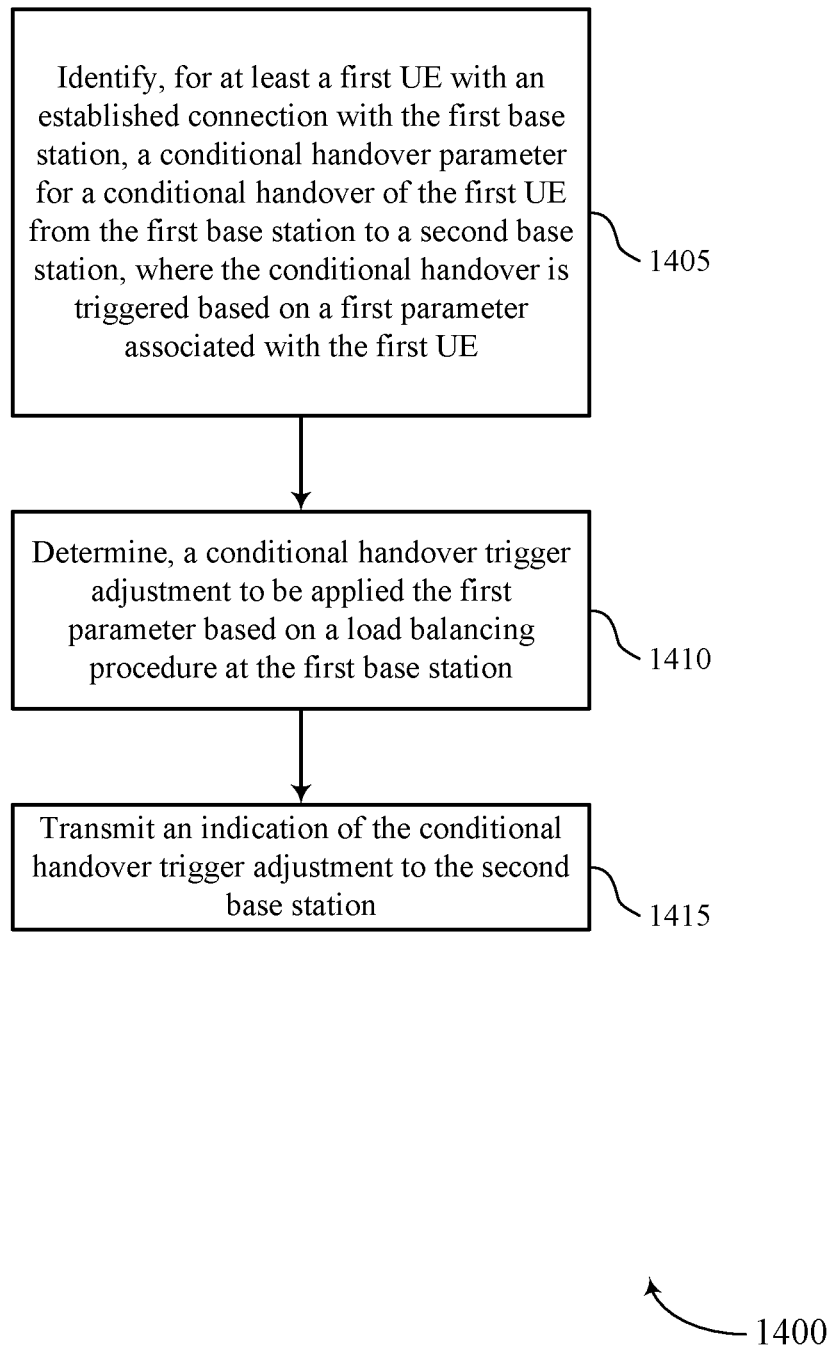

FIG. 14 shows a flowchart illustrating a method 1400 that supports enhancements to mobility settings change procedures in accordance with aspects of the present disclosure. The operations of method 1400 may be implemented by a base station 105 or its components as described herein. For example, the operations of method 1400 may be performed by a communications manager as described with reference to FIGS. 5 through 8. In some examples, a base station may execute a set of instructions to control the functional elements of the base station to perform the functions described below. Additionally or alternatively, a base station may perform aspects of the functions described below using special-purpose hardware.

At 1405, the base station may identify, for at least a first UE with an established connection with the first base station, a conditional handover parameter for a conditional handover of the first UE from the first base station to a second base station, where the conditional handover is triggered based on a first parameter associated with the first UE. The operations of 1405 may be performed according to the methods described herein. In some examples, aspects of the operations of 1405 may be performed by a mobility parameter manager as described with reference to FIGS. 5 through 8.

At 1410, the base station may determine, a conditional handover trigger adjustment to be applied the first parameter based on a load balancing procedure at the first base station. The operations of 1410 may be performed according to the methods described herein. In some examples, aspects of the operations of 1410 may be performed by a CHO manager as described with reference to FIGS. 5 through 8.

At 1415, the base station may transmit an indication of the conditional handover trigger adjustment to the second base station. The operations of 1415 may be performed according to the methods described herein. In some examples, aspects of the operations of 1415 may be performed by a mobility change request manager as described with reference to FIGS. 5 through 8.

Figure 15:
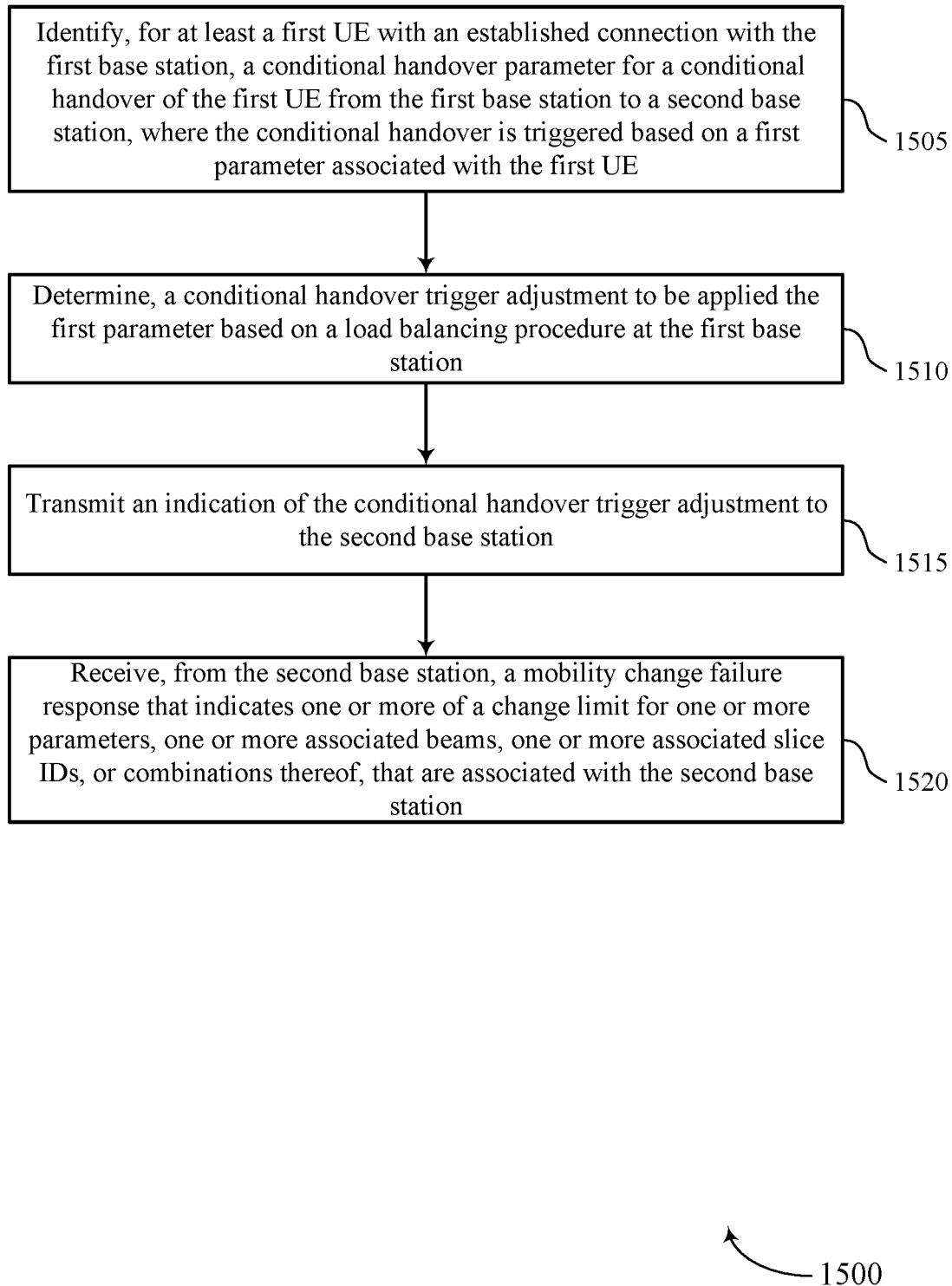

FIG. 15 shows a flowchart illustrating a method 1500 that supports enhancements to mobility settings change procedures in accordance with aspects of the present disclosure. The operations of method 1500 may be implemented by a base station 105 or its components as described herein. For example, the operations of method 1500 may be performed by a communications manager as described with reference to FIGS. 5 through 8. In some examples, a base station may execute a set of instructions to control the functional elements of the base station to perform the functions described below. Additionally or alternatively, a base station may perform aspects of the functions described below using special-purpose hardware.

At 1505, the base station may identify, for at least a first UE with an established connection with the first base station, a conditional handover parameter for a conditional handover of the first UE from the first base station to a second base station, where the conditional handover is triggered based on a first parameter associated with the first UE. The operations of 1505 may be performed according to the methods described herein. In some examples, aspects of the operations of 1505 may be performed by a mobility parameter manager as described with reference to FIGS. 5 through 8.

At 1510, the base station may determine, a conditional handover trigger adjustment to be applied the first parameter based on a load balancing procedure at the first base station. The operations of 1510 may be performed according to the methods described herein. In some examples, aspects of the operations of 1510 may be performed by a CHO manager as described with reference to FIGS. 5 through 8.

At 1515, the base station may transmit an indication of the conditional handover trigger adjustment to the second base station. The operations of 1515 may be performed according to the methods described herein. In some examples, aspects of the operations of 1515 may be performed by a mobility change request manager as described with reference to FIGS. 5 through 8.

At 1520, the base station may receive, from the second base station, a mobility change failure response that indicates one or more of a change limit for one or more parameters, one or more associated beams, one or more associated slice IDs, or combinations thereof, that are associated with the second base station. The operations of 1520 may be performed according to the methods described herein. In some examples, aspects of the operations of 1520 may be performed by a mobility parameter manager as described with reference to FIGS. 5 through 8. In some cases, the change limit for one or more parameters indicates an upper limit for a conditional handover to the second base station, a lower limit for a conditional handover to the second base station, or any combinations thereof. In some cases, the mobility change failure response includes at least one information element that indicates one or more available beam identifications, slice identification, or combinations thereof, associated with the second base station.

The following provides an overview of aspects of the present disclosure:

Aspect 1: A method for wireless communication at a first base station, comprising: determining a load balancing adjustment to be applied to one or more beams of a plurality of beams, one or more network slice identifications of a plurality of network slice identifications, or combinations thereof, for determining a handover of at least one UE from the first base station to a second base station; formatting, based at least in part on the determining, a mobility change request that indicates one or more parameters that are updated to provide the load balancing adjustment for the one or more beams, one or more network slice identifications, or combinations thereof; and transmitting the mobility change request to the second base station.

Aspect 2: The method of aspect 1, wherein the mobility change request indicates a difference from a previous value of the one or more parameters based at least in part on the load balancing adjustment.

Aspect 3: The method of any of aspects 1 through 2, wherein the formatting the mobility change request further comprises: formatting an information element with a first beam identification list that indicates one or more beams associated with the first base station and a second beam identification list that indicates one or more beams associated with the second base station.

Aspect 4: The method of aspect 3, wherein the first beam identification list and the second beam identification list each include one or more synchronization signal blocks (SSBs) associated with the mobility change request.

Aspect 5: The method of aspect 1, wherein the formatting the mobility change request further comprises: formatting an information element with a first slice identification associated with the first base station and a second slice identification associated with the second base station.

Aspect 6: The method of aspect 5, wherein the first slice identification and the second slice identification are associated with ultra-reliable low latency communication (URLLC) transmissions, enhanced mobile broadband (eMBB) transmissions, or massive machine type communications (mMTC) transmissions.

Aspect 7: The method of aspect 1, wherein the formatting the mobility change request further comprises: identifying one or more updated parameters for a conditional handover, wherein the one or more updated parameters are associated with conditions for executing operations associated with the handover of the at least one UE from the first base station to the second base station.

Aspect 8: The method of aspect 7, wherein the one or more updated parameters for the conditional handover indicate one or more conditional handover preparation parameter thresholds that indicate when a target cell is to be prepared for a handover, one or more conditional handover execution parameter thresholds that indicate that the target cell is to be selected for the handover, or any combinations thereof.

Aspect 9: The method of any of aspects 7 through 8, wherein the one or more updated parameters for conditional handover are different than non-conditional handover parameters and are adjusted independently of the non-conditional handover parameters.

Aspect 10: The method of any of aspects 1 through 9, wherein the formatting the mobility change request further comprises: configuring one or more reselection parameters that indicate how the at least one UE is to reselect to a new cell when in an idle or inactive state.

Aspect 11: The method of aspect 10, wherein the one or more reselection parameters are to be provided to the at least one UE in an SIB communication from the first base station or the second base station.

Aspect 12: The method of any of aspects 1 through 11, further comprising: receiving, from the second base station, a mobility change failure response that indicates one or more of a change limit for one or more parameters, one or more associated beams, one or more associated slice IDs, or combinations thereof, that are associated with the second base station.

Aspect 13: The method of aspect 12, wherein the change limit for one or more parameters indicates an upper limit for a conditional handover to the second base station, a lower limit for a conditional handover to the second base station, or any combinations thereof.

Aspect 14: The method of any of aspects 12 through 13, wherein the mobility change failure response includes at least one information element that indicates one or more available beam identifications, slice identification, or combinations thereof, associated with the second base station.

Aspect 15: A method for wireless communication at a first base station, comprising: identifying, for at least a first UE with an established connection with the first base station, a conditional handover parameter for a conditional handover of the first UE from the first base station to a second base station, wherein the conditional handover is triggered based at least in part on a first parameter associated with the first UE; determining, a conditional handover trigger adjustment to be applied the first parameter based at least in part on a load balancing procedure at the first base station; and transmitting an indication of the conditional handover trigger adjustment to the second base station.

Aspect 16: The method of aspect 15, wherein the transmitting comprises: transmitting the indication of the conditional handover trigger adjustment in a mobility change request.

Aspect 17: The method of aspect 16, wherein the mobility change request includes values for one or more of a conditional handover preparation trigger threshold, a conditional handover execution trigger threshold, one or more reselection parameters, or any combinations thereof.

Aspect 18: The method of aspect 17, wherein the conditional handover preparation trigger threshold and the conditional handover execution trigger threshold are adjusted separately from one or more threshold values for non-conditional handovers between the first base station and the second base station.

Aspect 19: The method of any of aspects 15 through 18, wherein the transmitting further comprises: formatting an information element for a mobility change request with a first beam identification list that indicates one or more beams associated with the first base station and a second beam identification list that indicates one or more beams associated with the second base station.

Aspect 20: The method of any of aspects 15 through 19, wherein the transmitting further comprises: formatting an information element for a mobility change request with a first slice identification associated with the first base station and a second slice identification associated with the second base station.

Aspect 21: An apparatus for wireless communication at a first base station, comprising a processor; memory coupled with the processor; and instructions stored in the memory and executable by the processor to cause the apparatus to perform a method of any of aspects 1 through 14.

Aspect 22: An apparatus for wireless communication at a first base station, comprising at least one means for performing a method of any of aspects 1 through 14.

Aspect 23: A non-transitory computer-readable medium storing code for wireless communication at a first base station, the code comprising instructions executable by a processor to perform a method of any of aspects 1 through 14.

Aspect 24: An apparatus for wireless communication at a first base station, comprising a processor; memory coupled with the processor; and instructions stored in the memory and executable by the processor to cause the apparatus to perform a method of any of aspects 15 through 20.

Aspect 25: An apparatus for wireless communication at a first base station, comprising at least one means for performing a method of any of aspects 15 through 20.

Aspect 26: A non-transitory computer-readable medium storing code for wireless communication at a first base station, the code comprising instructions executable by a processor to perform a method of any of aspects 15 through 20.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first base station, comprising:
    determining a load balancing adjustment to be applied to one or more beams of a plurality of beams for determining a handover of at least one user equipment (UE) from the first base station to a second base station;
    formatting, based at least in part on the determining, a mobility change request that indicates one or more parameters that are updated to provide the load balancing adjustment for the one or more beams, the mobility change request including an information element with a beam identification list that indicates one or more beams associated with the second base station, the beam identification list indicating one or more synchronization signal blocks (SSBs) associated with the mobility change request; and
    transmitting the mobility change request to the second base station.

2. The method of claim 1, wherein the mobility change request indicates a difference from a previous value of the one or more parameters based at least in part on the load balancing adjustment.

3. The method of claim 1, wherein the formatting the mobility change request comprises:
    formatting the information element with a second beam identification list that indicates one or more beams associated with the first base station.

4. The method of claim 3, wherein the second beam identification list indicates one or more SSBs associated with the mobility change request.

5. The method of claim 1, further comprising:
    determining the load balancing adjustment to be applied to one or more network slice identifications of a plurality of network slice identifications, wherein the formatting the mobility change request comprises:

formatting the information element with a first slice identification associated with the first base station and a second slice identification associated with the second base station.

6. The method of claim 5, wherein the first slice identification and the second slice identification are associated with ultra-reliable low latency communication (URLLC) transmissions, enhanced mobile broadband (eMBB) transmissions, or massive machine type communications (mMTC) transmissions.

7. The method of claim 1, wherein the formatting the mobility change request comprises:
identifying one or more updated parameters for a conditional handover, wherein the one or more updated parameters are associated with conditions for executing operations associated with the handover of the at least one UE from the first base station to the second base station.

8. The method of claim 7, wherein the one or more updated parameters for the conditional handover indicate one or more conditional handover preparation parameter thresholds that indicate when a target cell is to be prepared for a handover, one or more conditional handover execution parameter thresholds that indicate that the target cell is to be selected for the handover, or any combinations thereof.

9. The method of claim 7, wherein the one or more updated parameters for conditional handover are different than non-conditional handover parameters and are adjusted independently of the non-conditional handover parameters.

10. The method of claim 1, wherein the formatting the mobility change request comprises:
configuring one or more reselection parameters that indicate how the at least one UE is to reselect to a new cell when in an idle or inactive state.

11. The method of claim 10, wherein the one or more reselection parameters are to be provided to the at least one UE in a system information block (SIB) communication from the first base station or the second base station.

12. The method of claim 1, further comprising:
receiving, from the second base station, a mobility change failure response that indicates one or more of a change limit for one or more parameters, one or more associated beams, one or more associated slice IDs, or combinations thereof, that are associated with the second base station.

13. The method of claim 12, wherein the change limit for one or more parameters indicates an upper limit for a conditional handover to the second base station, a lower limit for a conditional handover to the second base station, or any combinations thereof.

14. The method of claim 12, wherein the mobility change failure response includes at least one information element that indicates one or more available beam identifications, slice identification, or combinations thereof, associated with the second base station.

15. A method for wireless communication at a first base station, comprising:
identifying, for at least a first user equipment (UE) with an established connection with the first base station, a conditional handover parameter for a conditional handover of the first UE from the first base station to a second base station, wherein the conditional handover parameter is different from, and adjusted separately from, a parameter for non-conditional handover comprising one or more threshold values for non-conditional handovers, and wherein the conditional handover is triggered based at least in part on a first parameter associated with the first UE;
determining, a conditional handover trigger adjustment to be applied, the first parameter based at least in part on a load balancing procedure at the first base station; and
transmitting an indication of the conditional handover trigger adjustment to the second base station in a mobility change request that indicates values for a conditional handover preparation trigger threshold and a conditional handover execution trigger threshold, wherein transmitting comprises formatting an information element for the mobility change request.

16. The method of claim 15, wherein the mobility change request includes a value for one or more reselection parameters.

17. The method of claim 16, wherein the conditional handover preparation trigger threshold and the conditional handover execution trigger threshold are adjusted separately from the one or more threshold values for non-conditional handovers between the first base station and the second base station.

18. The method of claim 15, wherein the transmitting comprises:
formatting the information element for the mobility change request with a first beam identification list that indicates one or more beams associated with the first base station and a second beam identification list that indicates one or more beams associated with the second base station.

19. The method of claim 15, wherein the transmitting comprises:
formatting the information element for the mobility change request with a first slice identification associated with the first base station and a second slice identification associated with the second base station.

20. An apparatus for wireless communication at a first base station, comprising:
one or more processors;
memory coupled with the one or more processors; and
instructions stored in the memory and executable by the one or more processors to cause the apparatus to:
determine a load balancing adjustment to be applied to one or more beams of a plurality of beams for determining a handover of at least one user equipment (UE) from the first base station to a second base station;
format, based at least in part on the determining, a mobility change request that indicates one or more parameters that are updated to provide the load balancing adjustment for the one or more beams, the mobility change request including an information element with a beam identification list that indicates one or more beams associated with the second base station, the beam identification list indicating one or more synchronization signal blocks (SSBs) associated with the mobility change request; and
transmit the mobility change request to the second base station.

21. The apparatus of claim 20, wherein the mobility change request indicates a difference from a previous value of the one or more parameters based at least in part on the load balancing adjustment.

22. The apparatus of claim 20, wherein the instructions to format the mobility change request are executable by the one or more processors to cause the apparatus to:

format the information element with a second beam identification list that indicates one or more beams associated with the first base station.

23. The apparatus of claim 20, wherein the instructions are further executable by the one or more processors to cause the apparatus to:
  determine the load balancing adjustment to be applied to one or more network slice identifications of a plurality of network slice identifications, wherein the instructions to format the mobility change request are executable by the one or more processors to cause the apparatus to:
    format the information element with a first slice identification associated with the first base station and a second slice identification associated with the second base station.

24. The apparatus of claim 20, wherein the instructions to format the mobility change request are executable by the one or more processors to cause the apparatus to:
  identify one or more updated parameters for a conditional handover, wherein the one or more updated parameters are associated with conditions for executing operations associated with the handover of the at least one UE from the first base station to the second base station.

25. The apparatus of claim 20, wherein the instructions to format the mobility change request are executable by the one or more processors cause the apparatus to:
  configure one or more reselection parameters that indicate how the at least one UE is to reselect to a new cell when in an idle or inactive state.

26. An apparatus for wireless communication at a first base station, comprising:
  one or more processors;
  memory coupled with the one or more processors; and
  instructions stored in the memory and executable by the one or more processors to cause the apparatus to:
    identify, for at least a first user equipment (UE) with an established connection with the first base station, a conditional handover parameter for a conditional handover of the first UE from the first base station to a second base station, wherein the conditional handover parameter is different from, and adjusted separately from, a parameter for non-conditional handover comprising one or more threshold values for non-conditional handovers, and wherein the conditional handover is triggered based at least in part on a first parameter associated with the first UE;
    determine, a conditional handover trigger adjustment to be applied the first parameter based at least in part on a load balancing procedure at the first base station; and
    transmit an indication of the conditional handover trigger adjustment to the second base station in a mobility change request that indicates values for a conditional handover preparation trigger threshold and a conditional handover execution trigger threshold, wherein transmitting comprises formatting an information element for the mobility change request.

27. The apparatus of claim 26, wherein the mobility change request includes a value for one or more reselection parameters.

28. The apparatus of claim 26, wherein the indication of the conditional handover trigger adjustment is a difference from a previous value of the conditional handover parameter based at least in part on the load balancing procedure.

* * * * *